United States Patent
Koolwal et al.

(10) Patent No.: US 9,992,150 B2
(45) Date of Patent: Jun. 5, 2018

(54) EVENT PLANNING ON ONLINE SOCIAL NETWORKS

(71) Applicant: Facebook, Inc., Menlo Park, CA (US)

(72) Inventors: Aditya Brij Koolwal, San Francisco, CA (US); Daniel Warner Smith, San Francisco, CA (US); Eduardo de Mello Maia, San Francisco, CA (US); Curtis Wayne Spencer, San Francisco, CA (US); Ken Deeter, Belmont, CA (US); Kieran Lafferty, San Francisco, CA (US); Jason Reid Ederle, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 212 days.

(21) Appl. No.: 14/571,164

(22) Filed: Dec. 15, 2014

(65) Prior Publication Data

US 2016/0173436 A1 Jun. 16, 2016

(51) Int. Cl.
*H04L 12/58* (2006.01)
*G06Q 50/00* (2012.01)
*H04W 4/20* (2018.01)

(52) U.S. Cl.
CPC ............ *H04L 51/32* (2013.01); *G06Q 50/01* (2013.01); *H04L 51/04* (2013.01); *H04W 4/206* (2013.01)

(58) Field of Classification Search
CPC ................................................... H04L 51/32
See application file for complete search history.

(56) References Cited

U.S. PATENT DOCUMENTS

| | | | | |
|---|---|---|---|---|
| 8,732,101 B1* | 5/2014 | Wilson | ............... | G06N 3/063 706/15 |
| 9,552,399 B1* | 1/2017 | Browning | ......... | G06F 17/30554 |
| 2004/0010512 A1* | 1/2004 | Smith | ............... | G06Q 10/10 |
| 2008/0092059 A1* | 4/2008 | White | ............... | G06Q 10/06 715/747 |
| 2008/0098087 A1* | 4/2008 | Lubeck | ............... | G06Q 10/00 709/218 |
| 2008/0294994 A1* | 11/2008 | Kruger | ............... | G06Q 10/109 715/733 |
| 2011/0191222 A1* | 8/2011 | Mashiach | ............... | G06Q 30/04 705/34 |
| 2012/0065944 A1* | 3/2012 | Nielsen | ............... | G06Q 10/103 703/1 |

(Continued)

*Primary Examiner* — Jimmy H Tran
(74) *Attorney, Agent, or Firm* — Baker Botts L.L.P.

(57) ABSTRACT

In particular embodiments, a computer server may receive information regarding an event proposal from an event organizer, where the information includes an identification of multiple invitees, and where the information is missing one or more significant details of the event proposal. The computer server may send the information regarding the event proposal to one or more client devices, where each of the client devices is associated with one of the invitees. The computer server may receive feedback regarding the event proposal from at least one of the invitees, and based on the received feedback, the computer server may determine at least one of the missing significant details of the event proposal. The computer server may send information regarding final details of an event based on the event proposal to one or more of the client devices associated with the invitees.

20 Claims, 10 Drawing Sheets

(56) References Cited

U.S. PATENT DOCUMENTS

| | | | |
|---|---|---|---|
| 2012/0136689 A1* | 5/2012 | Ickman | G06Q 10/1095 705/7.19 |
| 2013/0246526 A1* | 9/2013 | Wu | G06Q 10/109 709/204 |
| 2014/0012925 A1* | 1/2014 | Narayanan | G06Q 10/109 709/206 |
| 2014/0012926 A1* | 1/2014 | Narayanan | G06Q 50/01 709/206 |
| 2014/0047023 A1* | 2/2014 | Baldwin | G06Q 10/10 709/204 |
| 2014/0108526 A1* | 4/2014 | Garcia-Barrio | G06Q 50/01 709/204 |
| 2014/0278676 A1* | 9/2014 | Burka | G06Q 10/1093 705/7.19 |
| 2015/0058345 A1* | 2/2015 | Mishra | G06F 17/30241 707/737 |
| 2017/0132647 A1* | 5/2017 | Bostick | G06Q 30/0205 |

* cited by examiner

*FIG. 9*

*FIG. 10*

EVENT PLANNING ON ONLINE SOCIAL NETWORKS

TECHNICAL FIELD

This disclosure generally relates to planning events within a social-networking environment.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device—such as a smartphone, tablet computer, or laptop computer—may include functionality for determining its location, direction, or orientation, such as a GPS receiver, compass, altimeter, accelerometer, or gyroscope. Such a device may also include functionality for wireless communication over any conventional technology, such as, by way of example and not limitation, BLUETOOTH, near-field communication (NFC), radio frequency (e.g., RFID), infrared (IR), Wi-Fi, pager, or cellular (e.g., 2G, 3G, 4G). Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, an event organizer may plan an event where one or more significant details of the event are missing or left as "to be determined." The event organizer may generate an event proposal with some significant details of the event specified and other significant details either missing or only specified in an approximate manner. As an example and not by way of limitation, an event proposal to see a movie may specify a time and a place (e.g., 7:00 PM at the Kabuki Theater), but the movie to be seen is missing and left to be determined. The event proposal may be sent to multiple invitees, and through voting or discussions in a chat thread, the one or more missing significant details may be determined. The event invitees may vote on which movie they would like to see, or the event organizer and event invitees may use a chat thread to discuss and decide on with movie they would like to see. The event invitees may be able to respond to an event proposal by accepting (opting in to) or declining (opting out of) the event proposal. Invitees may receive notifications or updates for events to which they are invited or for events they have accepted. The event organizer may be able to monitor information about the event proposal, such as for example, the current vote tally and who has accepted or declined the event proposal. Once the missing significant details of an event proposal have been determined, the final details of an event based on the event proposal may be sent out to event invitees who have accepted the event proposal.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 9 illustrates an example event proposal displayed on a client device associated with an invitee.

FIG. 10 illustrates an example status screen for an event proposal.

DESCRIPTION OF EXAMPLE EMBODIMENTS

Figure 1:
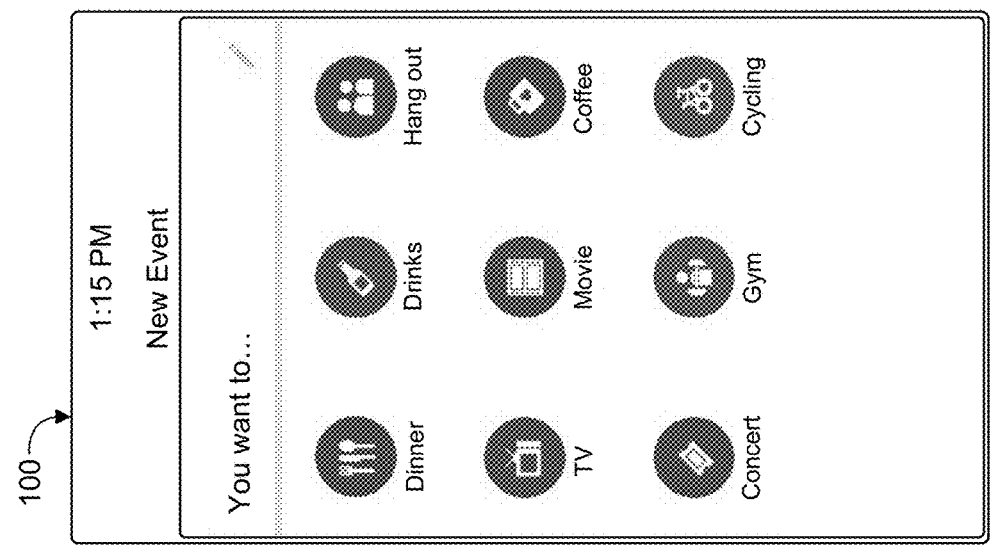
FIG. 1 illustrates an example user interface (UI) displayed on a client device, where an event organizer may use the UI to generate an event proposal.

FIG. 1 illustrates an example user interface (UI) displayed on client device 100, where an event organizer may use the UI to generate an event proposal. In particular embodiments, an event proposal may refer to an invitation for an event that is proposed by an event organizer and sent to one or more event invitees. In particular embodiments, an event organizer may refer to one or more persons who organize an event by generating an event proposal. In particular embodiments, client device 100 may be associated with a person organizing an event, who may be referred to as an event organizer. In particular embodiments, an event proposal may have a single event organizer or may have multiple event organizers who collaboratively create an event proposal. In particular embodiments, client device 100 may be a desktop computer, notebook or laptop computer, tablet computer, personal digital assistant, handheld electronic device, cellular telephone, smartphone, or any other suitable electronic device. In the example of FIG. 1, an event organizer may generate a new event proposal by first selecting an event type (e.g., "Dinner," "Drinks," "Hang out," "TV," "Movie," "Coffee," "Concert," "Gym," or "Cycling"). Although this disclosure describes and illustrates particular event proposals that include particular event types, this disclosure contemplates any suitable event proposals that include any suitable event types.

In particular embodiments, generating an event proposal may refer to selecting or specifying one or more significant details of an event proposal. The example UI in FIG. 1 (and the example UIs in FIGS. 2-7 described below) may be used by an event organizer to select or specify one or more significant details of an event proposal. In particular embodiments, a significant detail of an event proposal may include an event title, a specific or approximate date or time when an event will take place, a specific or approximate place or location where an event will occur, an event type, a characteristic of an event, one or more invitees, or any other suitable detail related to an event. As an example and not by way of limitation, an event organizer may create an event proposal to see a movie, and the significant details of the event proposal may include a date or time (e.g., "tonight at around 7:00 PM," "tomorrow afternoon," or "sometime this Sunday"); a place (e.g., "near downtown San Francisco," "the Kabuki Theater," or "the Stanford Theater"); a particular movie (e.g., Inside Llewyn Davis); one or more proposed movies (e.g., Her, The Wolf of Wall Street, Inside Llewyn Davis, or American Hustle); or a movie genre (e.g., a romantic comedy, an action movie, or a classic film). As another example and not by way of limitation, an event organizer may create an event proposal to go out to a restaurant, and the significant details of the event proposal may include a date or time (e.g., "this evening around sunset," "tomorrow morning," or "this Saturday at 6:00 PM"); a specific restaurant (e.g., Sancho's Taqueria); a group of restaurants (e.g., restaurants near the Ferry Building); a type of meal (e.g., brunch, lunch, or dinner); a cost category (e.g., inexpensive, moderate, or expensive); a type of restaurant or a characteristic of a restaurant (e.g., casual, quick-service, fancy, brew pub, food truck, outdoor seating, near the beach, or nice view); a type or category of cuisine (e.g., Thai, Cuban, or seafood); or a minimum or maximum number of people. In particular embodiments, information related to an event proposal may include information that is specific (e.g., "tomorrow at 9:00 AM," "let's go see American Hustle", or "drinks at The Tonga Room") or may include information that is approximate (e.g., "tonight at about 8:30 PM," "let's go see a movie," "brunch near Golden Gate Park," or "let's go to dinner—what price range are you interested in?"). Although this disclosure describes and illustrates particular UIs configured to generate particular event proposals with particular significant details, this disclosure contemplates any suitable UIs configured to generate any suitable event proposals with any suitable significant details.

In particular embodiments, information regarding an event proposal from an event organizer may be received at a computing device. As an example and not by way of limitation, a computer server that is part of a social-networking system may receive information regarding an event proposal from client device 100 of the event organizer. In particular embodiments, an event organizer may send out an event proposal before all of the details of an event are known, and the information regarding the event proposal may be missing one or more significant details of the event proposal. In particular embodiments, information regarding an event proposal may be missing one or more of date information, time information, location information, event-type information, invitee information, or any other suitable information related to the event. As an example and not by way of limitation, an event proposal may include date, time, and event-type information, but may be missing information related to the place or location of the event. For example, an event proposal to see a movie may include a time (e.g., "tonight," "at 6:00 PM," or "around 7:00 PM"), an event type (e.g., "movie"), but the event proposal may be missing information regarding the movie to be seen or the theater where the movie will be seen. As another example and not by way of limitation, an event proposal may include an event type (e.g., "let's go for a hike") and location information (e.g., "at Edgewood Park"), but the event proposal may be missing date or time information or the date or time information may be approximate (e.g., "tomorrow morning" or "sometime on Sunday").

In particular embodiments, significant details that are missing from an event proposal may include details that are not included in the event proposal or details that are not specific or are only described approximately in the event proposal. As an example and not by way of limitation, the significant details of an event proposal may include "let's meet for coffee at 10:00 AM," but the event proposal may be missing a significant detail about where to meet. As another example and not by way of limitation, although the event proposal "let's meet for coffee at 10:00 AM near Telegraph Avenue" specifies an approximate location ("near Telegraph Avenue"), it is missing a specific location detail (e.g., an address or the name of a cafe). Although this disclosure describes and illustrates particular event proposals that are missing particular significant details of the event proposal, this disclosure contemplates any suitable event proposals that are missing any suitable significant details.

Figure 2:
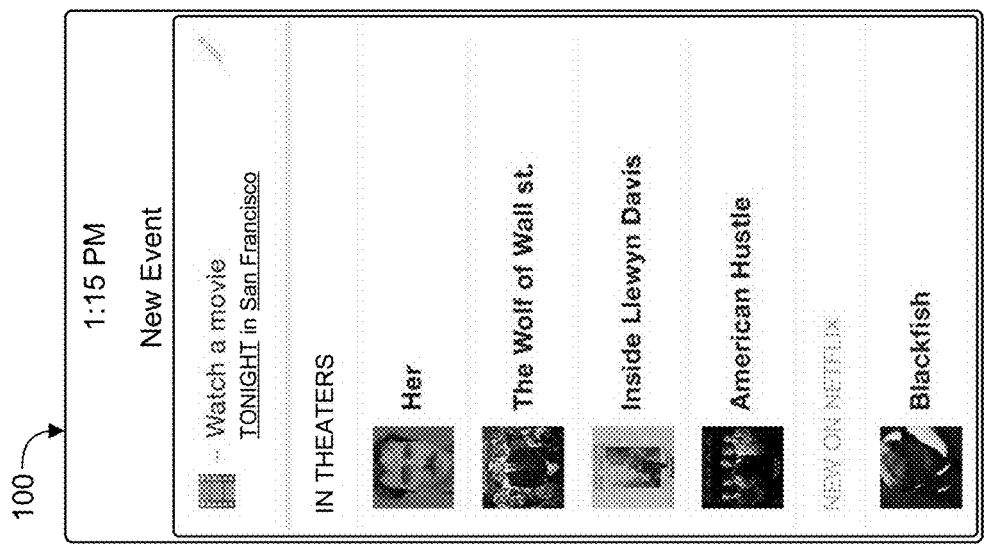
FIG. 2 illustrates an example UI for specifying details of an event proposal.

FIG. 2 illustrates an example UI for specifying details of an event proposal. In particular embodiments, details of an event proposal may include one or more significant details, such as for example, date, time, location, event type, invitees, or any other suitable information related to an event. In the example of FIG. 1, the event organizer may select the event type "Movie," and event organizer's client device 100 may then display the example UI of FIG. 2 for specifying significant details related to a "Movie" event proposal. In particular embodiments, based on a type of event, an event-proposal application may present different UIs for entering event details, where each UI may be tailored to each particular type of event (e.g., entering details for a movie event proposal may involve a UI that is, at least partially, different from a UI for entering details for a cycling event). In particular embodiments, an event-proposal application may include one or more UIs for specifying event details. As an example and not by way of limitation, the event-proposal application may include one UI for entering a date and time for the event proposal, another UI for entering a place or location for the event proposal, and one or more additional UIs for specifying other event details. In particular embodiments, the event-proposal application may include an option for keeping the event organizer's identity anonymous—in certain such embodiments, the event organizer may be listed as one of the invitees.

In the example of FIG. 2, the event organizer may use an event-proposal application to indicate that the event proposal has a time of "tonight" and a location of "in San Francisco." In particular embodiments, an event-proposal application may automatically present one or more options or suggestions to the event organizer as he or she enters event-proposal information. In particular embodiments, an event-proposal application may present suggestions to an event organizer based on one or more of the following: the event organizer's location, the type of event, a significant detail of the event proposal, social-networking information associated with the event organizer, or any other suitable information. In the example of FIG. 2, when the event organizer specifies watching a movie tonight in San Francisco, the event-proposal application may display a list of movies that are showing tonight in San Francisco or a list of movie theaters in San Francisco, and the event organizer may select one or more movies or theaters from the list. As another example and not by way of limitation, if an event organizer selects a dinner event, an event-proposal application may display a list of one or more restaurants. For example, if the event organizer specifies eating dinner at an Italian restaurant, the event-proposal application may present a list of Italian restaurants based on the event organizer's location, social-networking information, or any other suitable information. Although this disclosure describes and illustrates particular UIs for entering particular significant details for particular event proposals, this disclosure contemplates any suitable UIs for entering any suitable significant details for any suitable event proposals.

Figures 3, 4:
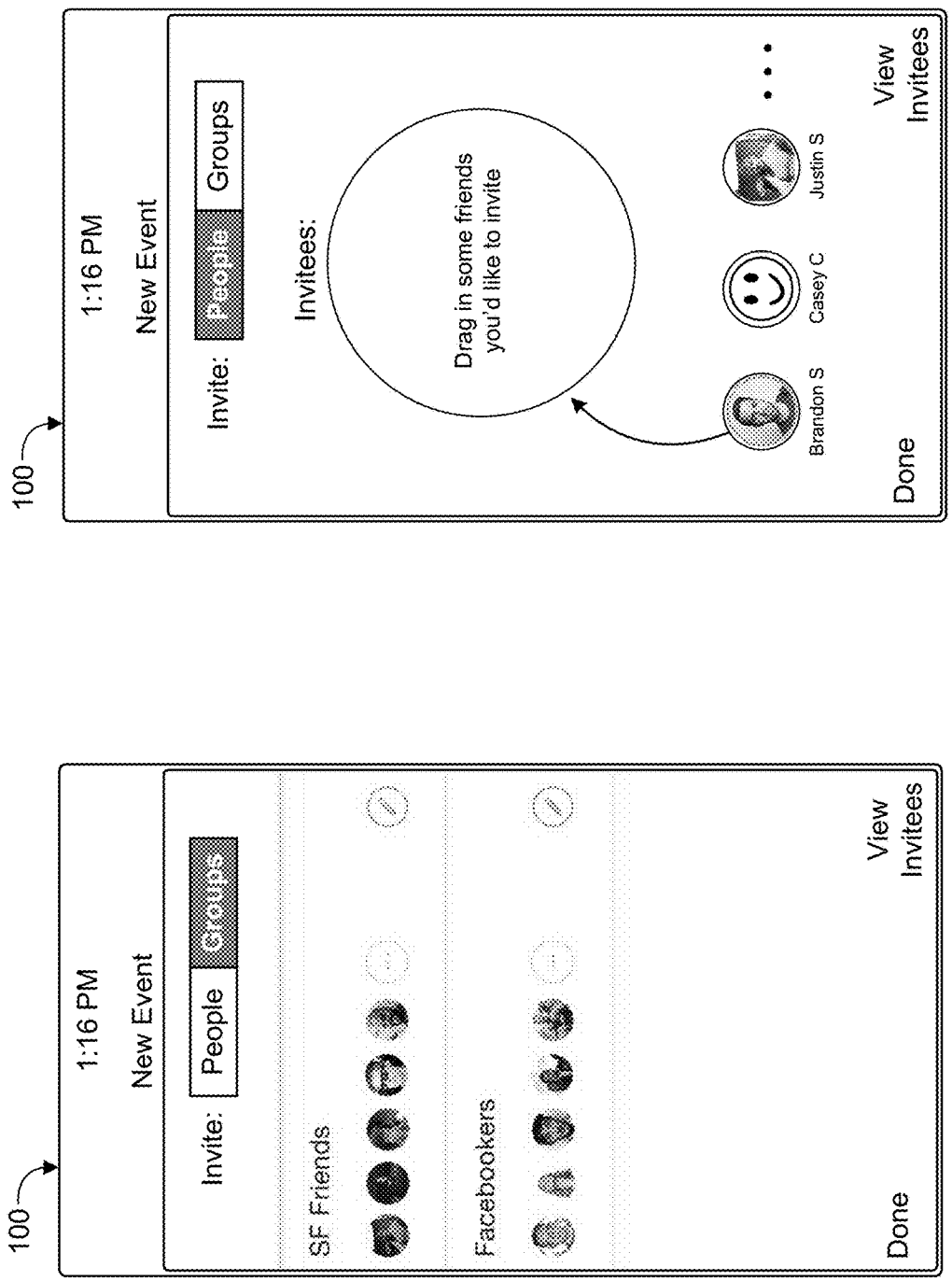
FIG. 3 illustrates an example UI for selecting groups of invitees to invite to an event.
FIGS. 4-5 illustrate an example UI for selecting individual invitees to invite to an event.

FIG. 3 illustrates an example UI for selecting groups of invitees to invite to an event. In particular embodiments, information regarding an event proposal may include an identification of one or more invitees (e.g., a name, nickname, picture, icon, phone number, email address, or userid for each invitee). In particular embodiments, information that includes an identification of invitees for an event proposal may be received at a computer server (e.g., a computer server of a social-networking system) from an event organizer. In particular embodiments, invitees for an event proposal may include a list of one or more friends, contacts, or associates of the event organizer or one or more categories or groups of people. A category or group of people may be a group of friends, neighbors, coworkers, classmates, or any other suitable group that includes two or more people.

In particular embodiments, an event-proposal application may enable a user to set up groups of candidate guests to invite to events, and an event organizer may be able to re-use previously defined groups for future event proposals. As an example and not by way of limitation, a user may define a group for use with event proposals by selecting people from a list of contacts or social-network connections. As illustrated in the example of FIG. 3, a group entitled "SF Friends" may be a user-created group of friends of the event organizer who live or work in San Francisco, and a group entitled "Coworkers" or "Facebookers" may be a group of coworkers who work at the same place as the event organizer. In the example of FIG. 3, the event organizer may select one or more of the previously defined groups (e.g., "SF Friends") to invite to the movie event. In particular embodiments, an event organizer may be able to re-use candidate guest lists generated during a planning period for a prior event. As an example and not by way of limitation, a group of invited users who accepted or responded to a prior event proposal may be used as an invitee group for a future event proposal, or a group of users who took a rain check for a prior proposed event may be used for a future event proposal.

Figures 5, 6:
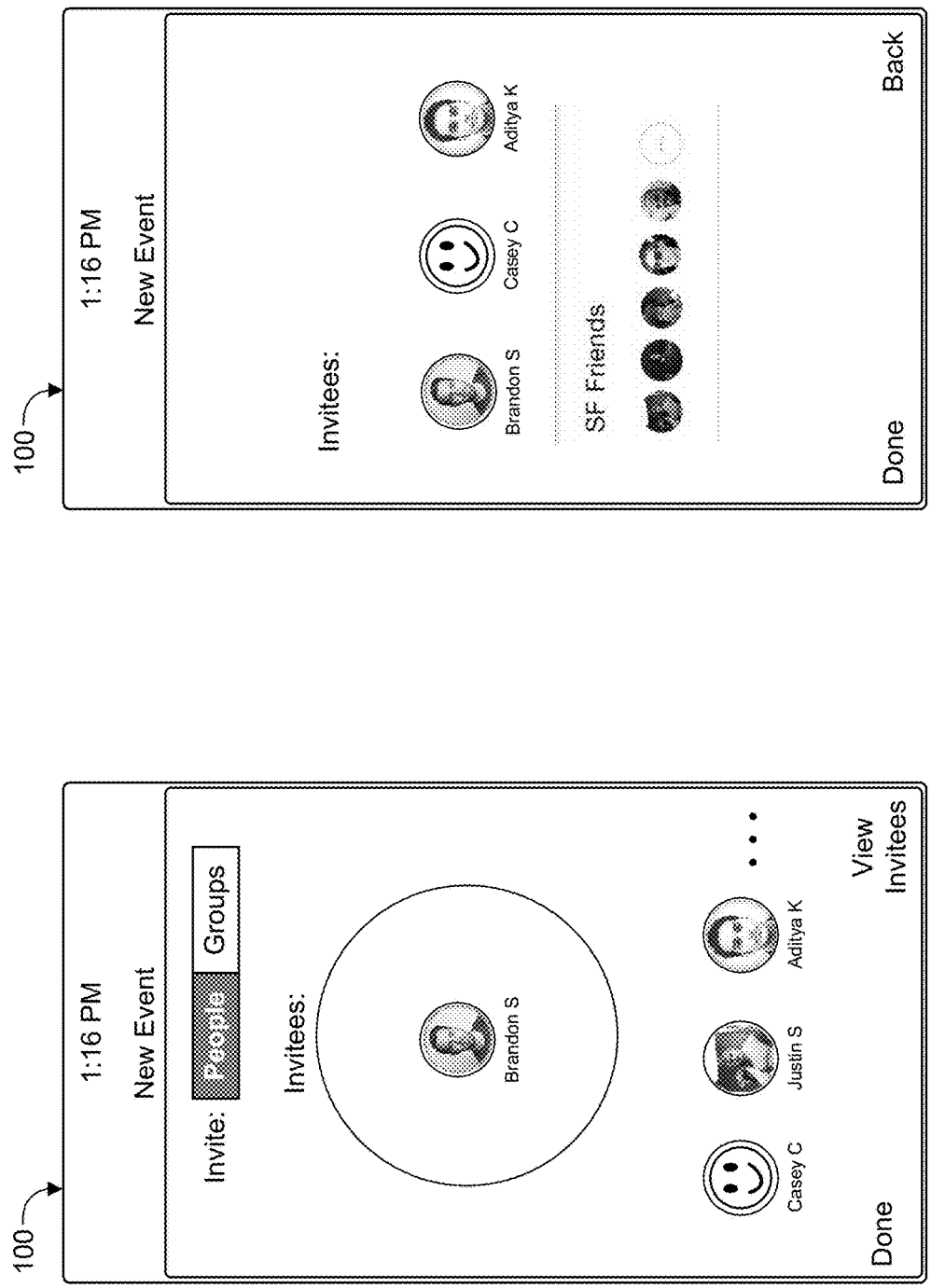
FIG. 6 illustrates an example UI displaying invitees for an event proposal.

FIGS. 4-5 illustrate an example UI for selecting individual invitees to invite to an event. In addition to or instead of selecting one or more groups of people to invite to an event, an event organizer may also select individual people to invite. In the examples of FIGS. 3-5, the event organizer may click or tap on the "People" or "Groups" selection to choose invitees from individual people or groups of people, respectively. In particular embodiments, an event-proposal application may present a list of friends, contacts, or associates for an event organizer to select invitees from. As an example and not by way of limitation, a list of users of a social-networking system who are connected to the event organizer may be presented to the event organizer as candidate invitees for an event proposal. In particular embodiments, a list of candidate invitees may include 1, 2, 3, 5, 10, 20, 50, or any suitable number of people, and at any given time an event-proposal application may display all or a subset of the entire list of candidate invitees. In the example of FIG. 4, three individual people (e.g., "Brandon S," "Casey C," and "Justin S") are presented as candidate invitees for the event organizer to choose from. In particular embodiments, an event-proposal application may display 1, 2, 3, 5, 10, 20, or any suitable number of candidate invitees in a UI at any given time.

In particular embodiments, an event organizer may select a person to invite by dragging or flinging the person's identifier (e.g., a name, picture, or icon that represents the person) into the ring labeled "Invitees:" and containing the message "Drag in some friends you'd like to invite." In particular embodiments, flinging a person's identifier into an invitee ring may include a user tapping or flicking their finger on the person's identifier, and this action may be followed by an animated sequence that shows the identifier flying, bouncing, or following a visually interesting path into the invitee ring. In FIG. 4, the event organizer selects "Brandon S" and flings the corresponding identifier into the invitee ring. In FIG. 5, "Brandon S" has been moved into the invitee ring, and the list of displayed candidate invitees has been updated to include an additional person, "Aditya K." In particular embodiments, an event organizer may add people to an invitee list by moving their identifier into the invitee ring, and the event organizer may also remove people from the invitee list by removing (e.g., by dragging or flinging) their identifier from the ring.

FIG. 6 illustrates an example UI displaying invitees for an event proposal. In particular embodiments, invitees for an event proposal may include one or more individual people as well as one or more groups of people. The example UI in FIG. 6 shows invitees for an event proposal that includes three people ("Brandon S," "Casey C," and "Aditya K") and a group entitled "SF Friends." In particular embodiments, an event organizer and one or more invitees of an event proposal may have a connection, association, or relationship via a social-networking system. In particular embodiments, an event organizer may switch between adding invitees using the UIs of FIGS. 3-5 and viewing invitees with the UI of FIG. 6. Although this disclosure describes and illustrates particular event proposals that include particular individual invitees or particular groups of invitees, this disclosure contemplates any suitable event proposals that include any suitable individual invitees or any suitable groups of invitees.

In particular embodiments, an event-proposal application may suggest one or more candidate invitees to an event organizer. In particular embodiments, suggested invitees may be determined based on social-networking information associated with the event organizer or with a suggested invitee. In particular embodiments, suggested invitees provided to an event organizer may be determined based on one or more of the following factors: the location or availability of a candidate invitee at the time the event is scheduled to occur; the affinity between the event organizer and a candidate invitee; the frequency that the suggested candidate invitee has joined previous events; or the history of the candidate user attending events that the event organizer also attended. As an example and not by way of limitation, if there is a relatively strong social-graph affinity between an event organizer and a particular person, then an event-proposal application may include that person's name in a list of candidate invitees, may promote that person's name so it appears at or near the top of a list of candidate invitees, or may directly present that person to the event organizer as a suggested invitee. As another example and not by way of limitation, if a person has another activity scheduled during a proposed event, then an event-proposal application may refrain from suggesting that person as a candidate invitee, may remove that person from a list of candidate invitees, or may move that person's name down so that it appears later or near the bottom of a list of candidate invitees. Generating suggestions and determining candidate invitees to suggest to an event organizer are described in further detail in U.S. patent application Ser. No. 13/544,197, filed 9 Jul. 2012 and U.S. patent application Ser. No. 13/584,625, filed 13 Aug. 2012, each of which is incorporated by reference.

In particular embodiments, details for an event proposal may be entered or selected by an event organizer in any suitable order. As an example and not by way of limitation, an event organizer may first select a type of event proposal, then select a time or a place for the event, and finally select people to invite. As another example and not by way of limitation, an event organizer may first select invitees for an event proposal, then select an event type, and finally select a time or place. Although this disclosure describes and illustrates particular event proposals with particular details selected in particular orders, this disclosure contemplates any suitable event proposal with any suitable details selected in any suitable order.

In particular embodiments, an event-proposal application may present suggestions or options to an event organizer as the event organizer selects details for an event proposal, where the suggestions are based on one or more event-proposal details already selected by the event organizer. As an example and not by way of limitation, an event proposal to see a movie in the next four hours may result in suggestions for people to invite based on their schedules or location (e.g., do not suggest people who have an activity or meeting scheduled for the same time or who are out of town). As another example and not by way of limitation, an event-proposal application may present options for an activity (e.g., movie, dinner, or going to the gym) based on invitees or on a proposed time or date for the event proposal. An event organizer may select a group of people for an event proposal and indicate that he or she would like to do something with this group within the next four hours. The actual activity for the event proposal may not be as important to the event organizer as the idea of just getting together with the selected group of people. Based on the selected group of people or the time constraint (e.g., within the next four hours), an event-proposal application may present to the event organizer one or more options for events. In particular embodiments, options presented to the event organizer may be based on social-networking information for the selected group of people, such as for example, events or activities liked by one or more people from the selected group of people. In particular embodiments, options presented to the event organizer may be based on previous event proposals (e.g., a suggestion for going to the gym may be presented based on the same group of people having accepted a previous event proposal to go to the gym). In particular embodiments, options presented to the event organizer may be based on a time constraint, such as for example, restaurants with available reservations within the next four hours. Although this disclosure describes particular suggestions presented to an event organizer based on particular details of an event proposal, this disclosure contemplates any suitable suggestions presented to an event organizer based on any suitable details of an event proposal.

Figures 7, 8:
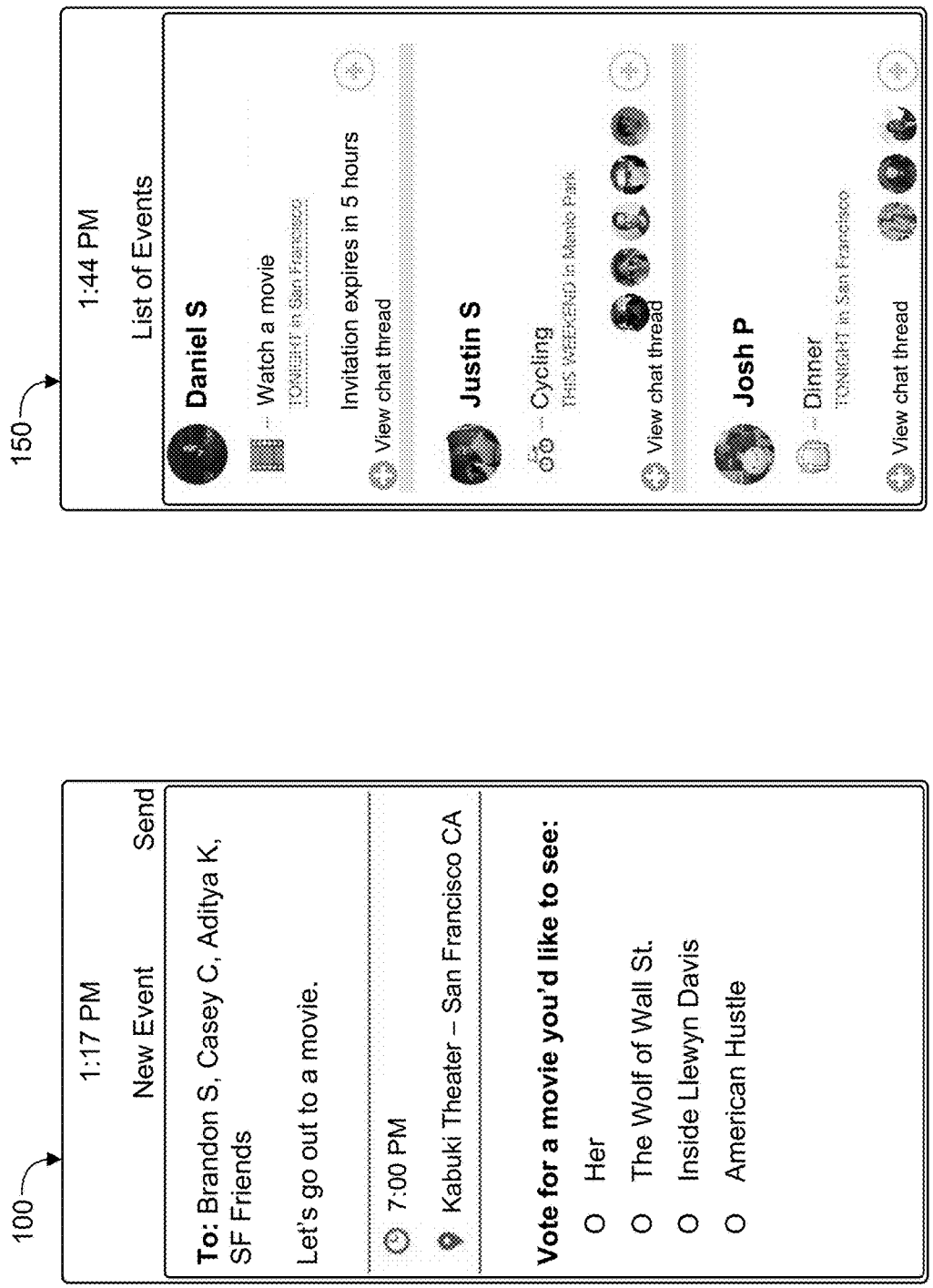
FIG. 7 illustrates an example event-proposal summary displayed on a client device associated with the event organizer.
FIG. 8 illustrates an example list of event proposals displayed on a client device.

FIG. 7 illustrates an example event-proposal summary displayed on client device 100 associated with the event organizer. In particular embodiments, an event organizer may review a summary of an event proposal prior to sending the event proposal out to the invitees. After reviewing the event proposal and prior to sending it out, the event organizer may revise some of the details of the event (e.g., add or remove an invitee, adjust the event time, or modify the event location). FIG. 7 shows an example summary of an event proposal that the event organizer may review. In particular embodiments, an event-proposal summary may include a list of invitees, a message from the event organizer (e.g., "Let's go out to a movie."), and some significant details of the event proposal. In FIG. 7, the event proposal indicates a time (7:00 PM), a movie theater (Kabuki Theater), and a list of four movies. In particular embodiments, after reviewing an event-proposal summary that includes information regarding the event proposal, an event organizer may send the event-proposal summary to a computer server. In particular embodiments, after receiving information regarding an event proposal from an event organizer, the computer server may send the information to one or more client devices, where each of the client devices is associated with one of the invitees.

In particular embodiments, an event proposal may include a list of candidate event details, and invitees may be asked to select from or vote on the candidates. In FIG. 7, the event proposal includes a request that the invitees vote for a movie they would like to see from among the four candidate movies displayed. In particular embodiments, an event proposal may be missing one or more significant details related to an event (e.g., time, location, event type, or other details related to the event). As examples and not by way of limitation, an event proposal may suggest going to a movie but may not specify a particular movie, or an event proposal may suggest going out to dinner but may not specify a particular restaurant. In particular embodiments, an event proposal may include some partial or approximate information for one or more significant details of an event but may be missing the particular information for those significant details. In FIG. 7, the event proposal is missing the significant detail of a particular movie, and instead of presenting a particular movie, the event proposal includes four candidate movies that invitees may vote on. As another example, a dinner event proposal may include a list of candidate restaurants (e.g., restaurants near the Ferry Building; sushi restaurants; or restaurants that are open late) that invitees may select from or vote on.

FIG. 8 illustrates an example list of event proposals displayed on client device 150. In particular embodiments, a list of event proposals may be sent by a computer server (e.g., a computer server of a social-networking system) and received by client device 150. In particular embodiments, client device 150 may be associated with an event invitee. In particular embodiments, an event invitee (or, an invitee) may refer to a person who is invited to one or more events. In particular embodiments, client device 150 may be a desktop computer, notebook or laptop computer, tablet computer, personal digital assistant, handheld electronic device, cellular telephone, smartphone, or any other suitable electronic device. In particular embodiments, a list of event proposals to which an invitee has been invited may be sent to client device 150 of the invitee, and the list may include a summary of information regarding each event proposal.

In FIG. 8, a user is provided with a list of event proposals to which the user has been invited. In particular embodiments, one or more event proposals in a list of event proposals may include a countdown timer or an expiration indicator. For example, the "Watch a movie" event in FIG. 8 is indicated as expiring in 5 hours. In particular embodiments, a list of event proposals provided to an invitee may include a brief summary of each event to which the user has been invited, and the user may expand an event proposal (e.g., by tapping or clicking on the brief summary) to view more information about the event proposal. In particular embodiments, a brief summary of an event proposal may include a name (e.g., "Justin S") or picture of an event organizer and a brief event description (e.g., "cycling this weekend in Menlo Park"). In particular embodiments, each entry in a list of event proposals sent to an invitee may include a link to a corresponding chat thread where the invitee can read or post comments related to the event proposal.

In particular embodiments, a user may be provided with a list of event proposals to which the user has been invited, and the event proposals may be ordered or prioritized according to one or more of the following: event proposals with the most recent chat activity may be positioned closer to the top of the list; event proposals expiring sooner may be closer to the top of the list; event proposals that the user has accepted or joined may be closer to the top of the list; or event proposals having greater social relevance to the user (e.g., the event organizer and invitee have a high social-graph coefficient) may be closer to the top of the list. Although this disclosure describes and illustrates particular lists of event proposals that include particular summary information and that are ordered in a particular manner, this disclosure contemplates any suitable lists of event proposals that include any suitable summary information and that are ordered in any suitable manner.

Figures 9, 10:
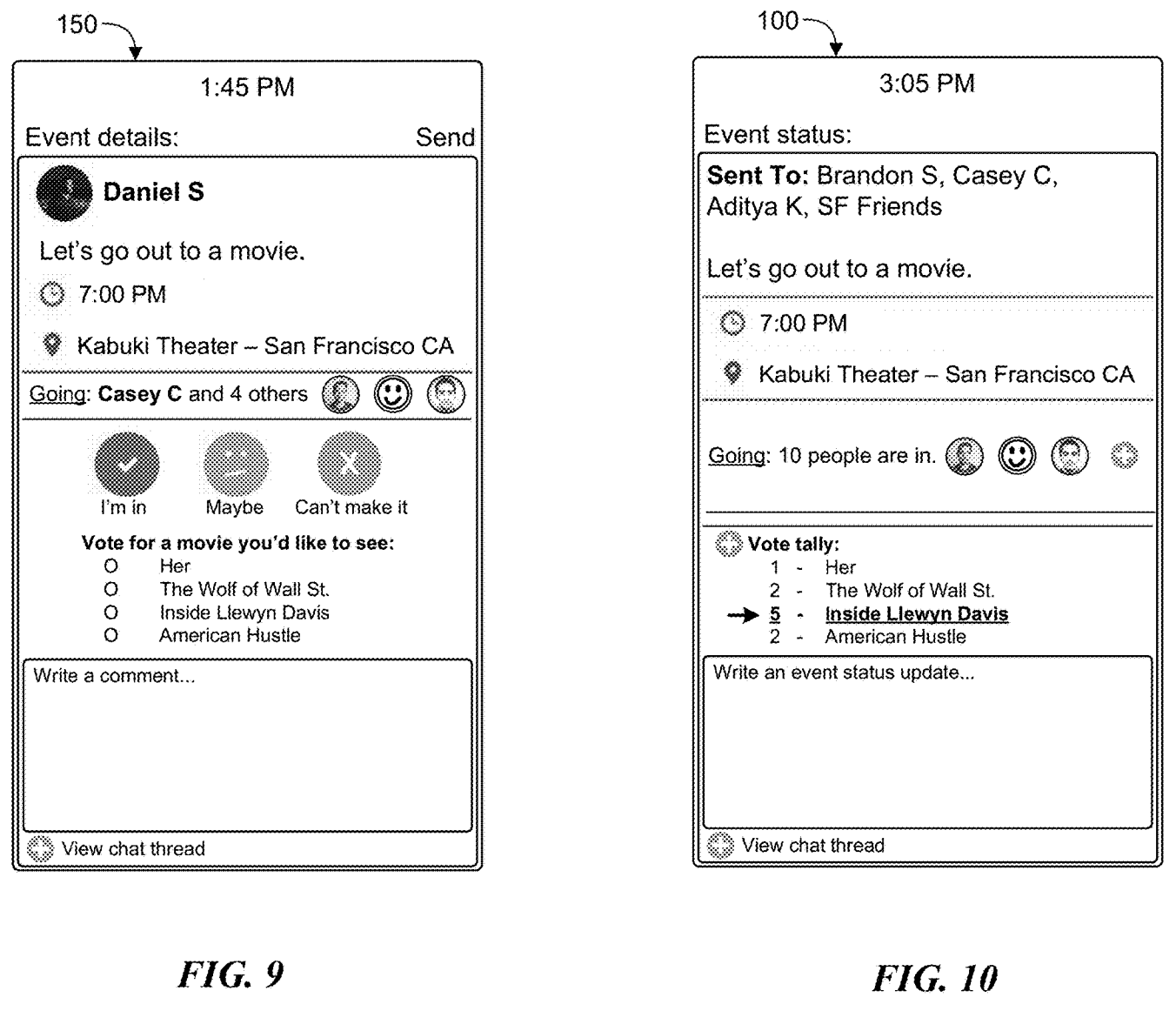

FIG. 9 illustrates an example event proposal displayed on client device 150 associated with an invitee. The movie event proposal in FIG. 9 may be displayed as a result of an invitee clicking or tapping on the brief summary of the event proposal from FIG. 8. In particular embodiments, an event proposal presented to an invitee may include one or more of the following information: an event organizer (e.g., "Daniel S"); a message from the event organizer (e.g., "Let's go out to a movie."); significant details of the proposed event (e.g., event time is 7:00 PM and event location is the Kabuki Theater); a list of invitees who have accepted (e.g., "Casey C and 4 others"); response buttons or check boxes for responding to the event proposal by opting in or accepting (e.g. "I'm in"), opting out or declining (e.g., "Can't make it"), or other responses (e.g., a tentative response of "Maybe"); a section for making a selection or vote related to the event (e.g., "Vote for a movie you'd like to see:"); a section for writing a comment; or any other suitable information. In particular embodiments, from an event proposal displayed on client device 150, an invitee may be able to access additional information related to the event proposal. As an example and not by way of limitation, in FIG. 9, an invitee may tap or click on the section labeled "Going" to get a list of invitees who have accepted the invitation. The invitee may also be able to see who has declined the invitation or who has not yet responded. As another example and not by way of limitation, in FIG. 9, an invitee may tap or click on the plus symbol or the phrase "View chat thread" to view comments about the event proposal posted by invitees or the event organizer. Although this disclosure describes and illustrates particular event proposals that include particular information, this disclosure contemplates any suitable event proposals that include any suitable information.

In particular embodiments, an event invitee may be able to opt in or accept an event proposal (e.g., by clicking or tapping on the "I'm in" response button), may be able to opt out or decline an event proposal (e.g., by clicking or tapping on the "Can't make it" response button), or may be able to make another selection (e.g., by selecting the "Maybe" response button). In particular embodiments, an event proposal may allow an event invitee to respond with a conditional acceptance. As an example and not by way of limitation, a response button labeled "Maybe" could allow a person to offer conditional acceptance of an event proposal, and the person may be able to specify their conditions (e.g., accept a movie-event proposal as long as it's not a romantic comedy; accept a movie-event proposal as long as the movie is not American Hustle; accept a dinner event proposal as long as the restaurant is nearby; or accept a dinner event proposal as long as the invitee can bring along two friends he or she is hanging out with). In particular embodiments, an event proposal may allow an invitee to decline or opt out of an event after they have opted in. As an example and not by way of limitation, a person who accepts an event proposal invitation may later realize that they have a schedule conflict, and they may want to go back to the event proposal and change their response to indicate that they cannot attend. In particular embodiments, an event proposal may allow an event invitee to decline an invitation but indicate their interest in attending future events. As an example and not by way of limitation, a response button labeled "Rain Check" could allow a person to opt out of the event proposal but also indicate that they would like to attend a similar event in the future. In particular embodiments, an event-proposal application with a rain-check feature may generate a rain-check group of candidate invitees for an event organizer to use when planning a similar event in the future.

In particular embodiments, an event proposal may include two or more missing significant details where the missing significant details are coupled. Coupled details may refer to details that are not independent of one another in that they affect or are contingent upon one another. As an example and not by way of limitation, an event proposal to go to dinner and then see a movie may be missing the significant details of where to go for dinner and which movie to see. The choice of a restaurant may affect which movie is a viable option and vice versa. If a restaurant is chosen that only has a reservation available for 7:00 PM, then the choice of movie may be limited to movies that start at 8:30 PM or later. If a movie is chosen that is playing at a particular movie theater, then restaurant choices may be limited to restaurants located near the particular theater. In particular embodiments, an event proposal may have two or more missing significant details, where each detail has two or more possibilities. As an example and not by way of limitation, an event proposal may have two missing significant details (e.g., which restaurant and which movie), and each detail may have two possibilities (e.g., a choice between two restaurants and a choice between two movies). There may be a total of four possible combinations of the details, but if the details are coupled, only two of the four possible combinations may be feasible. One restaurant may be located near a theater where one of the movies is showing, and the other restaurant may be located near another theater where the other movie is showing. The details may be coupled so that the choice of movie determines the restaurant and vice versa. Although this disclosure describes particular significant details that are coupled in particular manners, this disclosure contemplates any suitable significant details that are coupled in any suitable manners.

In particular embodiments, an event invitee may be able to vote on or indicate a preference related to a significant detail of the event proposal that is missing. In FIG. 9, a poll is presented to the invitee, and the invitee can vote for one of the four candidate movies (e.g., Her, The Wolf of Wall Street, Inside Llewyn Davis, or American Hustle) selected by the event organizer. In particular embodiments, a poll may include 2, 3, 4, 5, or any suitable number of options. In particular embodiments, a poll may include additional general options, such as for example, an "All of the Above" option to indicate that the user will attend the event regardless of which option is ultimately selected. In particular embodiments, a poll may allow an invitee to cast 1, 2, 3, or any suitable number of votes. As an example and not by way of limitation, for the poll illustrated in FIG. 9, an event invitee may be able to select two movies that they would like to see, or the event invitee may be able to rank their choices from 1 to 4 (e.g., vote "1" for the user's most preferred movie, and vote "4" for the least preferred movie).

In particular embodiments, an event invitee may be able to write a comment related to the event proposal (e.g., "I'd love to go, but I'm busy" or "I'm going—those movies all sound good to me"), and the comment may be posted to a chat thread associated with the event proposal. In particular embodiments, if an event invitee declines an invitation (e.g., clicks on the "Can't make it" icon), then the corresponding event proposal may be removed from or moved to near the bottom of a list of event proposals presented to the invitee.

In particular embodiments, an event invitee may receive a notification that they have been sent an event proposal. As examples and not by way of limitation, a message may appear on a user's client device 150 indicating that they have been sent an event proposal, or a new event proposal may be added at or near the top of a list of event proposals sent to the user. In particular embodiments, an invitee may only receive one notification of the original event proposal unless they respond with an acceptance or a tentative acceptance to the event proposal. As an example and not by way of limitation, one or more updates for an event proposal may be sent out after the original event proposal has been sent. For example, when a missing significant detail of an event proposal has been decided upon (e.g., a movie or a restaurant has been selected), an update may be sent out to invitees who have opted in to the event proposal, and invitees who have opted out of the event proposal may not receive the update.

FIG. 10 illustrates an example status screen for an event proposal. In particular embodiments, a status screen may display information associated with an event proposal, and portions of the displayed information may be updated in real time. As an example and not by way of limitation, a status screen may include one or more of the following: a list of invitees; significant details of the event proposal (e.g., title, time, date, location, event organizer, or any other suitable details related to the event); a list of invitees who have opted in, opted out, or not yet responded to the event proposal; a tally of votes related to the event proposal; a comment-input section (e.g., so the event organizer can post comments or event status updates to a chat thread); or a section for viewing a chat thread associated with the event proposal (or, a link to a chat thread). Although this disclosure describes and illustrates particular status screens that include particular information associated with particular event proposals, this disclosure contemplates any suitable status screens that include any suitable information associated with any suitable event proposals.

In the example of FIG. 10, the status screen indicates that 10 people have opted in to the event proposal, and by tapping or clicking on the plus symbol, a user may view a complete list of invitees who have opted in. A user may also be able to view the people who have opted out, the people who have not yet responded, or the people who have provided another response (e.g., "Maybe"). In particular embodiments, information related to who has opted in and who has opted out may be updated on a status screen in real time as event invitees respond to the event proposal. The status screen of FIG. 10 also shows a vote tally that indicates how many votes each movie has received (e.g., Her has received 1 vote, The Wolf of Wall Street has received 2 votes, etc.). In particular embodiments, in a vote tally, the candidate with the highest number of votes may be underlined, marked with an arrow, or highlighted in any other suitable manner. In FIG. 10, the movie Inside Llewyn Davis, which is underlined and marked with an arrow, has received 5 votes and is currently leading the vote tally. In particular embodiments, vote-tally information may be updated on a status screen in real time as event invitees make a selection in a vote. In particular embodiments, an event proposal status screen may be viewable only by the event organizer, may be viewable only by the organizer and invitees, or may be viewable only by the organizer and people who have opted in. As an example and not by way of limitation, an event proposal status screen that is viewable only by the event organizer may be used by the event organizer to periodically monitor the status of the event (e.g., the organizer can monitor a vote tally or check who has opted in or opted out). The event organizer may then post an event-status update based on information in the status screen. As an example and not by way of limitation, the event organizer may post an event-status update to the chat thread regarding how many people have opted in or the current status of the vote tally (e.g., "Inside Llewyn Davis is leading with 5 votes.").

In particular embodiments, an event-proposal application may allow an event organizer to generate an event proposal that is viewable by one or more invitees or by one or more people who are not explicitly included as invitees. As an example and not by way of limitation, an event organizer may generate an event proposal that may be circulated to or viewed by people who are not explicitly included as invitees. In addition or as an alternative to sending an event proposal to one or more event invitees, the event proposal may be posted to a public or semi-private events feed where it may be viewed by people who are explicitly invited (e.g., close friends of the event organizer) or people who are not explicitly invited. In particular embodiments, an event organizer may generate an event proposal that requires a double opt in procedure, where, in order to attend the event, a person must be included on an invitee list or must be explicitly approved by the event organizer. As an example and not by way of limitation, after a person responds by opting in to an event proposal, that person may not be included on a list of people attending the event unless the event organizer has already indicated they are an invitee or the event organizer explicitly approves that person as a valid attendee. A person who opts in to an event proposal posted on a public events feed may only be added to an attendee list for the event once the event organizer approves that person as an attendee. If the event organizer does not give an explicit approval to a person who has opted in to an event proposal, then that person may not be included on a list of approved attendees.

In particular embodiments, an event-proposal application may allow an event organizer to manage or update a list of invitees on the fly or in real time based on the opt-in or opt-out status of the event invitees. As an example and not by way of limitation, an event organizer may be able to successively increase the number of event invitees (e.g., if only a small number of the original invitees have opted in) by adding new event invitees or by allowing or encouraging event invitees to forward the event proposal to other people.

In particular embodiments, an event-proposal application may allow an event organizer to create a "first-come, first-served" type of event proposal that may have a maximum number of guests. As an example and not by way of limitation, an event organizer may have four extra tickets to a baseball game, and the corresponding event proposal may be configured so that only the first four invitees who accept the event proposal get to go. As another example and not by way of limitation, an event organizer may be organizing a doubles match of tennis, and the corresponding event proposal may be open only to the first three invitees who accept. In particular embodiments, an event-proposal application may allow an event organizer to create a conditional event proposal that specifies a minimum number of guests, and the event may not occur unless or until a minimum number of invitees accept the event proposal. As an example and not by way of limitation, an event organizer planning a game of soccer may wish to have at least eight people accept the corresponding event proposal before the event is finalized. As another example and not by way of limitation, an event organizer may wish to keep the cost for renting a boat below a certain maximum amount per guest, and so, the corresponding event proposal may require a minimum number of acceptances before the event is finalized.

In particular embodiments, an event proposal may have a cutoff time for invitees to accept the event proposal. As an example and not by way of limitation, an event organizer may want to purchase a group of tickets for an event by a particular time, and the event organizer may configure the event proposal to stop accepting invitee responses after a particular cutoff time.

In particular embodiments, an event-proposal application may be configured to determine a likelihood of acceptance of one or more of the event invitees. As examples and not by way of limitation, an event invitee's likelihood of acceptance may be determined based at least on part on one or more of the following factors: the invitee's location (e.g., an invitee who is far away from the event may be less likely to accept the event proposal); the invitee's velocity of approach to a specified destination (e.g., an invitee heading in the direction of the event may be more likely to accept); the invitee's history in relationship to previous event proposals (e.g., an invitee who has accepted previous similar events may be more likely to accept); or social-networking information, such as for example the social-graph coefficient between the invitee and the event organizer or one or more of the other invitees (e.g., an invitee having a strong social-graph coefficient with one or more invitees who have accepted the event proposal may be more likely to also accept the event proposal).

In particular embodiments, an event-proposal application may allow an event organizer to collect payments, reimbursements, or deposits from event invitees upon acceptance of an event proposal. As an example and not by way of limitation, an event organizer may collect a reimbursement for the cost of a ticket to an event from each event invitee who accepts the event proposal. As another example and not by way of limitation, an event organizer may collect a deposit from each invitee who accepts an event proposal to go to dinner at a fancy restaurant. The event organizer may wish to collect deposits or up-front payments to cover part of the dinner cost in case an invitee does not show up or later decides not to attend after the event organizer has already made a dinner reservation. In particular embodiments, payments collected with respect to an event proposal may include a sliding scale or adjustable amounts that decrease as more event invitees accept the event proposal. As an example and not by way of limitation, an event proposal to rent a sailboat for a fixed rental fee may involve collecting a payment from each event invitee who accepts. The collected payment may be approximately equal to the rental fee divided by the number of event attendees so that the collected payment per invitee decreases as more invitees accept the event proposal.

Figure 11:
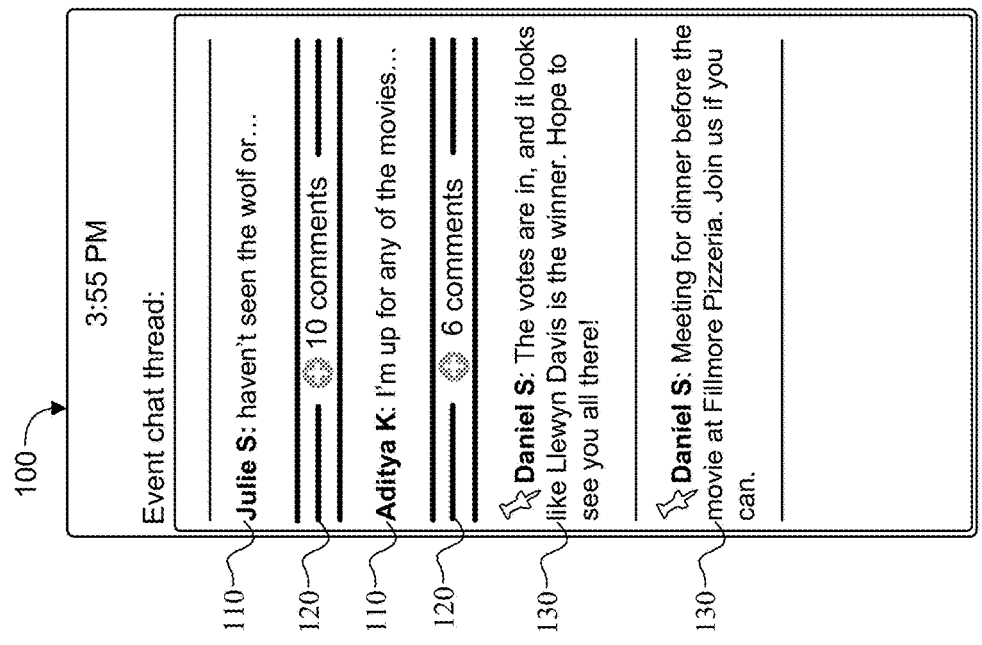
FIG. 11 illustrates an example chat thread associated with an event proposal.

FIG. 11 illustrates an example chat thread associated with an event proposal. In particular embodiments, a chat thread (or, chat interface) may provide an opportunity for an event organizer or event invitees to discuss or influence the final details of an event proposal by posting comments to the chat thread. As an example and not by way of limitation, event invitees may be able to suggest alternatives or influence others to join the event or to cast their votes for a particular selection. In particular embodiments, a chat thread may display invitee comments 110, collapsed comment sections 120, or event status updates 130. In FIG. 11, the chat thread shows invitee comments 110 from invitees Julie S and Aditya K as well as two collapsed comment sections 120. A user may expand a collapsed comment section 120 to reveal the collapsed comments by tapping or clicking on the corresponding plus symbol. In FIG. 11, two event status updates 130 posted by the event organizer Daniel S are shown. In particular embodiments, an event-proposal application may allow an event organizer to moderate or edit a chat thread associated with an event proposal. As an example and not by way of limitation, an event moderator may be able to delete or collapse particular comments from a chat thread (e.g., comments that are off topic or that are no longer relevant to the event proposal). As another example and not by way of limitation, an event moderator may be able to pin or highlight important messages in a chat thread. In FIG. 11, the status updates 130 from the organizer (Daniel S) that provide updates on the voting tally and a pre-movie restaurant are marked with pin icons to indicate that they are important messages.

In particular embodiments, important or pinned messages in a chat thread may be displayed in full while other messages in a chat thread may be truncated. In FIG. 11, the important status updates 130 from the organizer are displayed in full, while only the first few words of invitee comments 110 are displayed. Tapping or clicking on a particular truncated comment in a chat thread may result in the comment being expanded so a user can view the full comment. In particular embodiments, an event-proposal application may automatically pin or highlight certain comments 110 or status updates 130 that are determined to be important. As an example and not by way of limitation, any status update 130 from the event organizer may be automatically pinned and displayed in full. Although this disclosure describes and illustrates particular chat threads associated with particular event proposals, this disclosure contemplates any suitable chat threads associated with any suitable event proposals.

In particular embodiments, a computer server (e.g., a computer server of a social-networking system) may receive feedback regarding an event proposal from at least one of the invitees. In particular embodiments, receiving feedback regarding an event proposal may include receiving information via a chat interface. In particular embodiments, a computer server may create a chat thread for discussion of details related to an event proposal and provide a chat interface to the invitees. In the example of FIG. 9, an invitee may write a comment related to the event proposal, and the comment may be posted to a chat thread that may be viewed by the event organizer and the event invitees. Similarly, in the example of FIG. 10, an event organizer may write a status update related to the event proposal, and the status update may be posted to the chat thread. In particular embodiments, a computer server may send a notification to the invitees of an event proposal that a chat thread has been created. As an example and not by way of limitation, a computer server may send a message to an invitee indicating that a chat thread associated with a particular event proposal is available for posting or reading comments. As another example and not by way of limitation, an event proposal may include a notice or a link (e.g., a plus symbol or a message "View chat thread") to a chat thread. In particular embodiments, a computer server may receive messages sent, using the chat interface, by the invitees in relation to the chat thread. As an example and not by way of limitation, a computer server may receive the comments in a chat thread, and the computer server may use information from the chat thread to determine one of the missing significant details of an event proposal. Although this disclosure describes and illustrates particular feedback received via particular chat interfaces, this disclosure contemplates any suitable feedback received via any suitable chat interfaces.

In particular embodiments, receiving feedback regarding an event proposal from at least one of the invitees may include receiving one or more opt-in or opt-out notifications related to the event proposal. In the example of FIG. 9, an event invitee may respond to the event proposal by clicking or tapping on one of the response buttons (e.g., "I'm in," "Maybe," or "Can't make it"), and the invitee's response may be sent to a computer server (e.g., a computer server of a social-networking system). The responses from each of the invitees received by the computer server may be stored or tracked by the computer server and may be provided to the event organizer or the event invitees in the form of a message, a notification, or an event-proposal status screen, such as for example, the status screen of FIG. 10. Although this disclosure describes and illustrates particular feedback in the form of particular opt-in or opt-out notifications, this disclosure contemplates any suitable feedback in the form of any suitable opt-in or opt-out notifications.

In particular embodiments, receiving feedback regarding an event proposal from at least one of the invitees may include receiving one or more votes in a poll related to at least one of the missing significant details of the event proposal. As an example and not by way of limitation, an event proposal may include a poll (or, a vote) to allow invitees to vote for their preference regarding one of the missing significant details of the event (e.g., which restaurant to go to; what time to begin a bike ride; or how far to hike). In the example event proposal of FIG. 9, invitees are presented with a poll to select which of the four displayed movies they would prefer to see. In particular embodiments, receiving feedback regarding an event proposal from at least one of the invitees may include tallying the votes from a poll. As an example and not by way of limitation, each vote cast in a poll may be sent to a computer server, and the computer server may store or tally the votes and send a vote tally to client device 100 of the event organizer. In the example of FIG. 10, a status screen displays a vote tally indicating how many votes each movie has received. In particular embodiments, a user may view details of a poll (e.g., which persons voted for which option) by tapping or clicking on a vote tally or a plus symbol located near the vote tally. Although this disclosure describes and illustrates particular feedback in the form of particular polls or particular vote tallies, this disclosure contemplates any suitable feedback in the form of any suitable polls or any suitable vote tallies.

In particular embodiments, a computer server (e.g., a computer server of a social-networking system) may determine at least one of the missing significant details of an event proposal based on feedback received in relation to the event proposal. In particular embodiments, a computer server may determine a missing significant detail of an event proposal based on event-proposal feedback, and the determination may be performed automatically by the computer server so that the event organizer may not need to provide input or make the determination. As an example and not by way of limitation, a computer server may sample, analyze, or tally feedback related to an event proposal, and based on the feedback, the computer server may determine a time, place, location, or other detail related to an event proposal, where the determined detail was missing from or only specified approximately in the original event proposal.

In particular embodiments, determining at least one of the missing significant details of an event proposal based on the received feedback may include processing opt-in notifications to determine a subset of the invitees who have opted in. As an example and not by way of limitation, an event proposal to go to a restaurant for dinner may involve selecting a restaurant based on the number of people who accept the event proposal. For example, if six or fewer people accept the dinner-event proposal, then the event may occur at a smaller or more formal restaurant, while if ten or more people accept the event proposal, then they might go to a larger or more casual restaurant. In particular embodiments, determining at least one of the missing significant details of an event proposal based on the received feedback may include processing voting information. In the example of FIG. 10, the vote tally shows that the movie Inside Llewyn Davis has received the most votes, and at a certain time (e.g., 1-3 hours before the movie is scheduled to begin) or after a particular number of acceptances have been received (e.g., after receiving 10 acceptances or after one half of the invitees have responded to the event proposal), a computer server may determine that, based on the voting information, the selected movie is Inside Llewyn Davis. In particular embodiments, determining at least one of the missing significant details of an event proposal based on the received feedback may include analyzing comments or status updates from a chat thread. As an example and not by way of limitation, the comments associated with an event proposal may be analyzed to extract string information or to determine whether or how many of certain words or strings (e.g., names of proposed movies or restaurants) are present in the chat thread. The words or strings from the chat thread can be tallied or matched with terms in the event proposal to determine a missing significant detail of the event proposal. Although this disclosure describes and illustrates determining particular missing significant details of particular event proposals based on particular event-proposal feedback, this disclosure contemplates determining any suitable missing significant details of any suitable event proposals based on any suitable event-proposal feedback.

Figure 12:
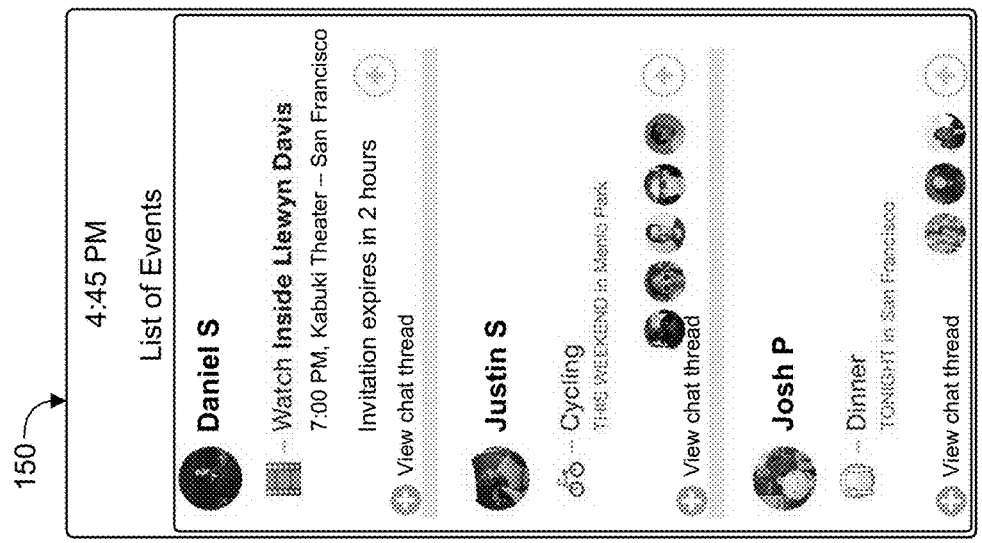
FIG. 12 illustrates the example list of event proposals from FIG. 8 with updates made to the first event proposal.

FIG. 12 illustrates the example list of event proposals from FIG. 8 with updates made to the first event proposal. In FIG. 8, the first event-proposal summary included the description "Watch a movie," and the particular movie to be watched, which was undetermined, was a missing significant detail of the event proposal. In FIG. 12, the missing significant detail has been determined based at least in part on the results of the poll, and the event proposal has been updated to indicate that the movie to be seen is Inside Llewyn Davis. In particular embodiments, a computer server may send to an invitee a list that summarizes the event proposals that have been sent to the invitee, and each entry in the list may include summary information for an associated event proposal. In particular embodiments, a computer server may send to an invitee an update to an event proposal or an update to a summary of an event proposal based on updates or changes made to the event proposal. In particular embodiments, a computer server may automatically send an update to an invitee when an event proposal has been changed or updated or when a missing significant detail of an event proposal has been determined. As an example and not by way of limitation, if an event organizer makes a change to an event proposal, then a corresponding update to the event proposal may be sent to the event invitees or to the invitees who have accepted the event proposal. As another example and not by way of limitation, if a missing significant detail of an event proposal has been determined, then a corresponding update to the event proposal or event-proposal summary may be automatically sent to the invitees.

In particular embodiments, a computer server may send information regarding final details of an event based on an event proposal to one or more of client devices 150 associated with the invitees. In particular embodiments, final details of an event may refer to an event based on an event proposal where any missing significant details of the event proposal have been determined. In particular embodiments, a computer server may automatically send information regarding final details of an event. As an example and not by way of limitation, when all the missing significant details of an event proposal have been determined, the event proposal may be finalized, and the final details (e.g., with no missing significant details) of an event may be sent. For example, an event proposal that includes the details "let's go to dinner tomorrow evening" may result in an event with final details that include going to dinner at "Tommy's Mexican Restaurant" tomorrow at 6:00 PM. In particular embodiments, sending information regarding final details of an event may include sending an update to a summary of the information regarding the event proposal. Although this disclosure describes and illustrates particular final details of particular events based on particular event proposals, this disclosure contemplates any suitable final details of any suitable events based on any suitable event proposals.

In particular embodiments, sending information regarding final details of an event may include sending the final details of the event to only the client devices 150 associated with invitees who have accepted the event proposal. As an example and not by way of limitation, only invitees who have accepted an event proposal may receive final details of an event, and invitees who have declined or not responded to the event proposal may not receive the final details. In particular embodiments, sending information regarding final details of the event may include sending information to request final confirmation of attendance. As an example and not by way of limitation, event invitees who have accepted an event proposal may receive final details of an event associated with the event proposal, and the event invitees may be asked to send a final confirmation that, after reviewing the final details, they still plan to attend the event. In particular embodiments, requesting final confirmation of attendance may include sending information to request pre-payment for the event. As an example and not by way of limitation, along with sending a final confirmation, an event organizer may request that event invitees also send some form of payment for the event (e.g., a payment to cover the cost of a ticket or an invitee's portion of a rental fee).

In particular embodiments, an event proposal may be configured to expire after a particular duration of time or at some particular time. As an example and not by way of limitation, an event proposal may be configured to expire six hours after it was created or sent out or expire at some particular time (e.g., at 6:00 PM, at 30 minutes prior to the start time of the event proposal, or at the start time of the event proposal). In particular embodiments, an expiration time or a duration until an event proposal will expire may be displayed as part of an event proposal or as part of an event-proposal summary. In the example of FIG. 8, the movie event proposal is indicated as expiring in about five hours from the displayed time (1:44 PM), and in FIG. 12 the movie event proposal expires in about two hours from the displayed time of 4:45 PM. In particular embodiments, once an event proposal's expiration time has passed, a computer server may send a cancellation instruction for the event proposal to any one of client devices 150 from which no feedback has been received. Client device 150 associated with any event invitee who has not responded to the event proposal may receive a cancellation instruction. In particular embodiments, a cancellation instruction may operate to remove information regarding the associated event proposal from a client device and remove the summary of the information regarding the event proposal from the list of event proposals.

In particular embodiments, upon receiving information regarding an event proposal from an event organizer, a computer server may provide the information regarding the event proposal to a third party. As an example and not by way of limitation, information regarding an event proposal with one or more missing significant details may be sent to potential advertisers who may be interested in promoting their products, services, or venue to provide one or more of the missing significant details for the event proposal. In particular embodiments, the computer server may receive sponsored content relating to one or more of the missing significant details of an event proposal and may present the sponsored content to the event organizer or the event invitees. As an example and not by way of limitation, information for an event proposal to see a movie where the movie or the theater has not been determined may be provided to a third party (e.g., a movie theater company, a movie company, or an entity that provides advertising or coupons related to movies or theaters). The third party may send to the computer server an advertisement for a movie or a coupon that could be redeemed at a particular movie theater, and the advertisement or coupon may be sent by the computer server to the event organizer or the attendees. As another example and not by way of limitation, information for an event proposal to have dinner at some restaurant near a particular location may be provided to a third party (e.g., a restaurant or an entity that provides restaurant advertising). The third party may provide an advertisement or a coupon for a restaurant that is near the particular location, and this advertisement or coupon may be sent to the event organizer or the attendees. In particular embodiments, an advertisement or coupon for a product, service, or venue may be provided to an event organizer or invitee, where the product, service, or venue is related to an event proposal. As an example and not by way of limitation, an event proposal to go to dinner at a particular restaurant may result in an advertisement for a venue (e.g., a movie theater or an ice skating rink) that is located near the particular restaurant. As another example and not by way of limitation, an event organizer for an event proposal to go wine tasting in the Napa Valley may receive an advertisement for a van or limousine service that the organizer may choose to hire for the event. As yet another example and not by way of limitation, event invitees for a costume-party event proposal may receive an advertisement for a costume store. Although this disclosure describes particular sponsored content provided in response to particular event proposals with particular missing significant details, this disclosure contemplates any suitable sponsored content provided in response to any suitable event proposals with any suitable missing significant details.

Figure 13:
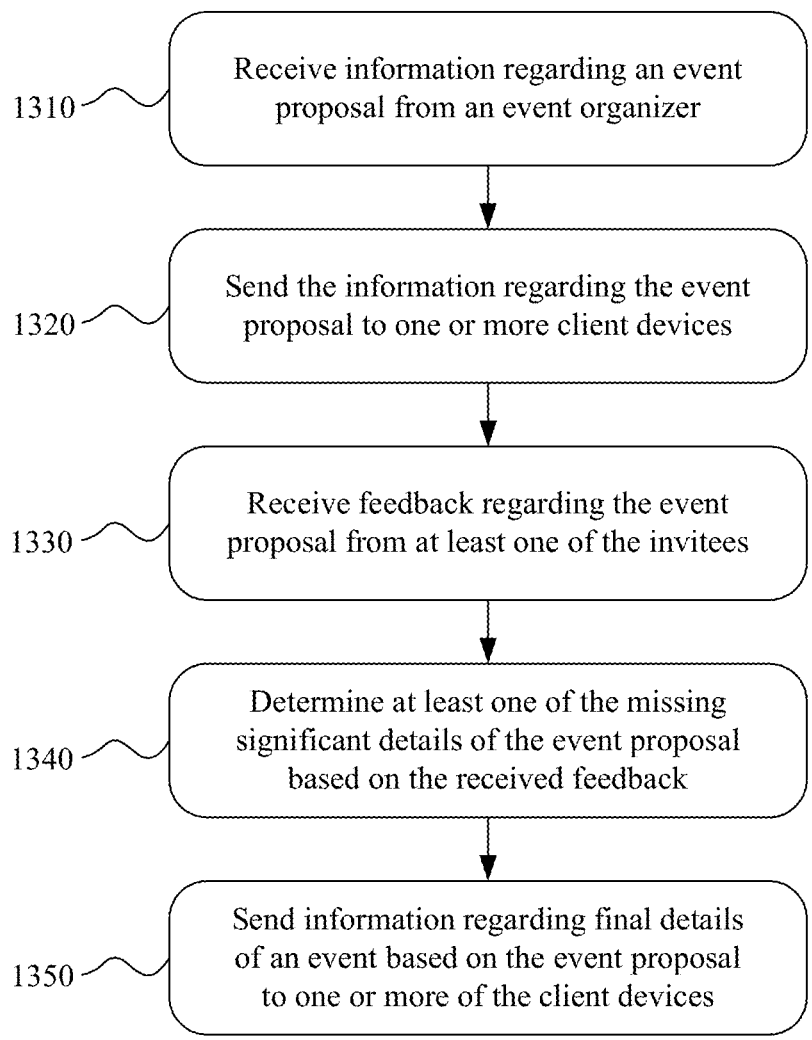
FIG. 13 illustrates an example method for planning an event.

FIG. 13 illustrates an example method 1300 for planning an event. The method may begin at step 1310, where a computer server may receive information regarding an event proposal from an event organizer. In particular embodiments, the computer server may be a server of a social-networking system. In particular embodiments, the information may include an identification of multiple invitees, and the information may be missing one or more significant details of the event proposal. At step 1320, the computer server may send the information regarding the event proposal to one or more client devices, where each of the client devices may be associated with one of the invitees. At step 1330, the computer server may receive feedback regarding the event proposal from at least one of the invitees. In particular embodiments, at least part of the feedback may be received by way of a chat thread. At step 1340, the computer server may determine at least one of the missing significant details of the event proposal based on the received feedback. At step 1350, the computer server may send information regarding final details of an event based on the event proposal to one or more of the client devices associated with the invitees, at which point the method may end. Particular embodiments may repeat one or more steps of the method of FIG. 13, where appropriate. Although this disclosure describes and illustrates particular steps of the method of FIG. 13 as occurring in a particular order, this disclosure contemplates any suitable steps of the method of FIG. 13 occurring in any suitable order. Moreover, although this disclosure describes and illustrates an example method for planning an event including the particular steps of the method of FIG. 13, this disclosure contemplates any suitable method for planning an event including any suitable steps, which may include all, some, or none of the steps of the method of FIG. 13, where appropriate. Furthermore, although this disclosure describes and illustrates particular components, devices, or systems carrying out particular steps of the method of FIG. 13, this disclosure contemplates any suitable combination of any suitable components, devices, or systems carrying out any suitable steps of the method of FIG. 13.

Figure 14:
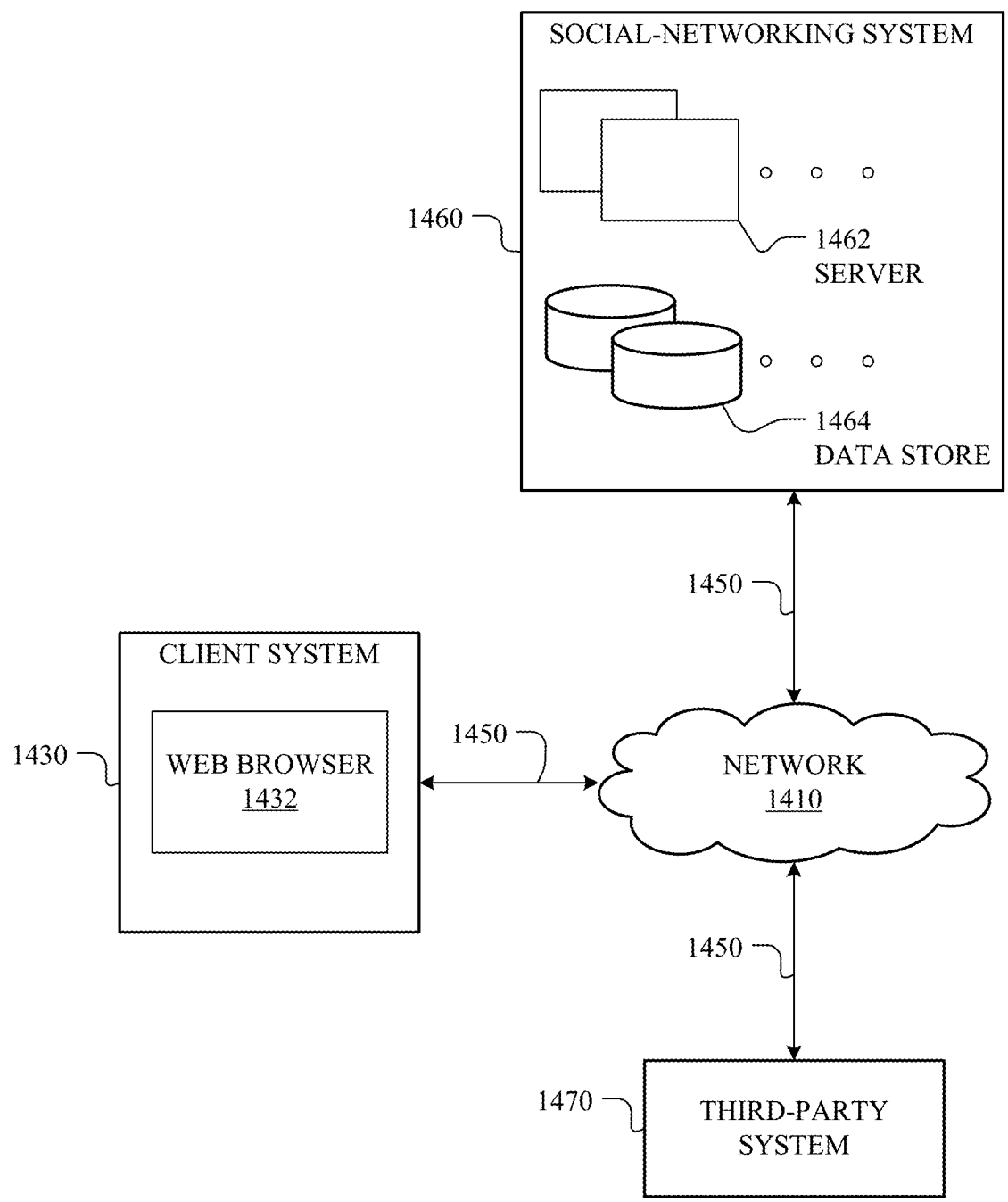
FIG. 14 illustrates an example network environment associated with a social-networking system.

FIG. 14 illustrates an example network environment 1400 associated with a social-networking system. Network environment 1400 includes client system 1430, social-networking system 1460, and third-party system 1470 connected to each other by a network 1410. Although FIG. 14 illustrates a particular arrangement of client system 1430, social-networking system 1460, third-party system 1470, and network 1410, this disclosure contemplates any suitable arrangement of client system 1430, social-networking system 1460, third-party system 1470, and network 1410. As an example and not by way of limitation, two or more of client system 1430, social-networking system 1460, and third-party system 1470 may be connected to each other directly, bypassing network 1410. As another example, two or more of client system 1430, social-networking system 1460, and third-party system 1470 may be physically or logically co-located with each other in whole or in part. Moreover, although FIG. 14 illustrates a particular number of client systems 1430, social-networking systems 1460, third-party systems 1470, and networks 1410, this disclosure contemplates any suitable number of client systems 1430, social-networking systems 1460, third-party systems 1470, and networks 1410. As an example and not by way of limitation, network environment 1400 may include multiple client system 1430, social-networking systems 1460, third-party systems 1470, and networks 1410.

This disclosure contemplates any suitable network 1410. As an example and not by way of limitation, one or more portions of network 1410 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1410 may include one or more networks 1410.

Links 1450 may connect client system 1430, social-networking system 1460, and third-party system 1470 to communication network 1410 or to each other. This disclosure contemplates any suitable links 1450. In particular embodiments, one or more links 1450 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 1450 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 1450, or a combination of two or more such links 1450. Links 1450 need not necessarily be the same throughout network environment 1400. One or more first links 1450 may differ in one or more respects from one or more second links 1450.

In particular embodiments, client system 1430 may be an electronic device including hardware, software, or embedded logic components or a combination of two or more such components and capable of carrying out the appropriate functionalities implemented or supported by client system 1430. As an example and not by way of limitation, client system 1430 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 1430. Client system 1430 may enable a network user at client system 1430 to access network 1410. Client system 1430 may enable its user to communicate with other users at other client systems 1430.

In particular embodiments, client system 1430 may include a web browser 1432, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 1430 may enter a Uniform Resource Locator (URL) or other address directing the web browser 1432 to a particular server (such as server 1462, or a server associated with third-party system 1470), and the web browser 1432 may generate a Hyper Text Transfer Protocol (HTTP) request and communicate the HTTP request to server. The server may accept the HTTP request and communicate to client system 1430 one or more Hyper Text Markup Language (HTML) files responsive to the HTTP request. Client system 1430 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 1460 may be a network-addressable computing system that can host an online social network. Social-networking system 1460 may generate, store, receive, and send social-networking data, such as, for example, user-profile data, concept-profile data, social-graph information, or other suitable data related to the online social network. Social-networking system 1460 may be accessed by the other components of network environment 1400 either directly or via network 1410. In particular embodiments, social-networking system 1460 may include one or more servers 1462. Each server 1462 may be a unitary server or a distributed server spanning multiple computers or multiple datacenters. Servers 1462 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 1462 may include hardware, software, or embedded logic components or a combination of two or more such components for carrying out the appropriate functionalities implemented or supported by server 1462. In particular embodiments, social-networking system 1460 may include one or more data stores 1464. Data stores 1464 may be used to store various types of information. In particular embodiments, the information stored in data stores 1464 may be organized according to specific data structures. In particular embodiments, each data store 1464 may be a relational, columnar, correlation, or other suitable database. Although this disclosure describes or illustrates particular types of databases, this disclosure contemplates any suitable types of databases. Particular embodiments may provide interfaces that enable client system 1430, social-networking system 1460, or third-party system 1470 to manage, retrieve, modify, add, or delete, the information stored in data store 1464.

In particular embodiments, social-networking system 1460 may store one or more social graphs in one or more data stores 1464. In particular embodiments, a social graph may include multiple nodes—which may include multiple user nodes (each corresponding to a particular user) or multiple concept nodes (each corresponding to a particular concept)—and multiple edges connecting the nodes. Social-networking system 1460 may provide users of the online social network the ability to communicate and interact with other users. In particular embodiments, users may join the online social network via social-networking system 1460 and then add connections (i.e., relationships) to a number of other users of social-networking system 1460 whom they want to be connected to. Herein, the term "friend" may refer to any other user of social-networking system 1460 with whom a user has formed a connection, association, or relationship via social-networking system 1460.

In particular embodiments, social-networking system 1460 may provide users with the ability to take actions on various types of items or objects, supported by social-networking system 1460. As an example and not by way of limitation, the items and objects may include groups or social networks to which users of social-networking system 1460 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 1460 or by an external system of third-party system 1470, which is separate from social-networking system 1460 and coupled to social-networking system 1460 via a network 1410.

In particular embodiments, social-networking system 1460 may be capable of linking a variety of entities. As an example and not by way of limitation, social-networking system 1460 may enable users to interact with each other as well as receive content from third-party systems 1470 or other entities, or to allow users to interact with these entities through an application programming interfaces (API) or other communication channels.

In particular embodiments, third-party system 1470 may include one or more types of servers, one or more data stores, one or more interfaces, including but not limited to APIs, one or more web services, one or more content sources, one or more networks, or any other suitable components, e.g., that servers may communicate with. A third-party system 1470 may be operated by a different entity from an entity operating social-networking system 1460. In particular embodiments, however, social-networking system 1460 and third-party systems 1470 may operate in conjunction with each other to provide social-networking services to users of social-networking system 1460 or third-party systems 1470. In this sense, social-networking system 1460 may provide a platform, or backbone, which other systems, such as third-party systems 1470, may use to provide social-networking services and functionality to users across the Internet.

In particular embodiments, third-party system 1470 may include a third-party content object provider. A third-party content object provider may include one or more sources of content objects, which may be communicated to client system 1430. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 1460 also includes user-generated content objects, which may enhance a user's interactions with social-networking system 1460. User-generated content may include anything a user can add, upload, send, or "post" to social-networking system 1460. As an example and not by way of limitation, a user communicates posts to social-networking system 1460 from client system 1430. Posts may include data such as status updates or other textual data, location information, photos, videos, links, music or other similar data or media. Content may also be added to social-networking system 1460 by a third-party through a "communication channel," such as a newsfeed or stream.

In particular embodiments, social-networking system 1460 may include a variety of servers, sub-systems, programs, modules, logs, and data stores. In particular embodiments, social-networking system 1460 may include one or more of the following: a web server, action logger, API-request server, relevance-and-ranking engine, content-object classifier, notification controller, action log, third-party-content-object-exposure log, inference module, authorization/privacy server, search module, ad-targeting module, user-interface module, user-profile store, connection store, third-party content store, or location store. Social-networking system 1460 may also include suitable components such as network interfaces, security mechanisms, load balancers, failover servers, management-and-network-operations consoles, other suitable components, or any suitable combination thereof. In particular embodiments, social-networking system 1460 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 1460 to one or more client systems 1430 or one or more third-party system 1470 via network 1410. The web server may include a mail server or other messaging functionality for receiving and routing messages between social-networking system 1460 and one or more client systems 1430. An API-request server may allow third-party system 1470 to access information from social-networking system 1460 by calling one or more APIs. An action logger may be used to receive communications from a web server about a user's actions on or off social-networking system 1460. In conjunction with the action log, a third-party-content-object log may be maintained of user exposures to third-party-content objects. A notification controller may provide information regarding content objects to client system 1430. Information may be pushed to client system 1430 as notifications, or information may be pulled from client system 1430 responsive to a request received from client system 1430. Authorization servers may be used to enforce one or more privacy settings of the users of social-networking system 1460. A privacy setting of a user determines how particular information associated with a user can be shared. The authorization server may allow users to opt in or opt out of having their actions logged by social-networking system 1460 or shared with other systems (e.g., third-party system 1470), such as, for example, by setting appropriate privacy settings. Third-party-content-object stores may be used to store content objects received from third parties, such as third-party system 1470. Location stores may be used for storing location information received from client systems 1430 associated with users. Advertisement-pricing modules may combine social information, the current time, location information, or other suitable information to provide relevant advertisements, in the form of notifications, to a user.

Figure 15:
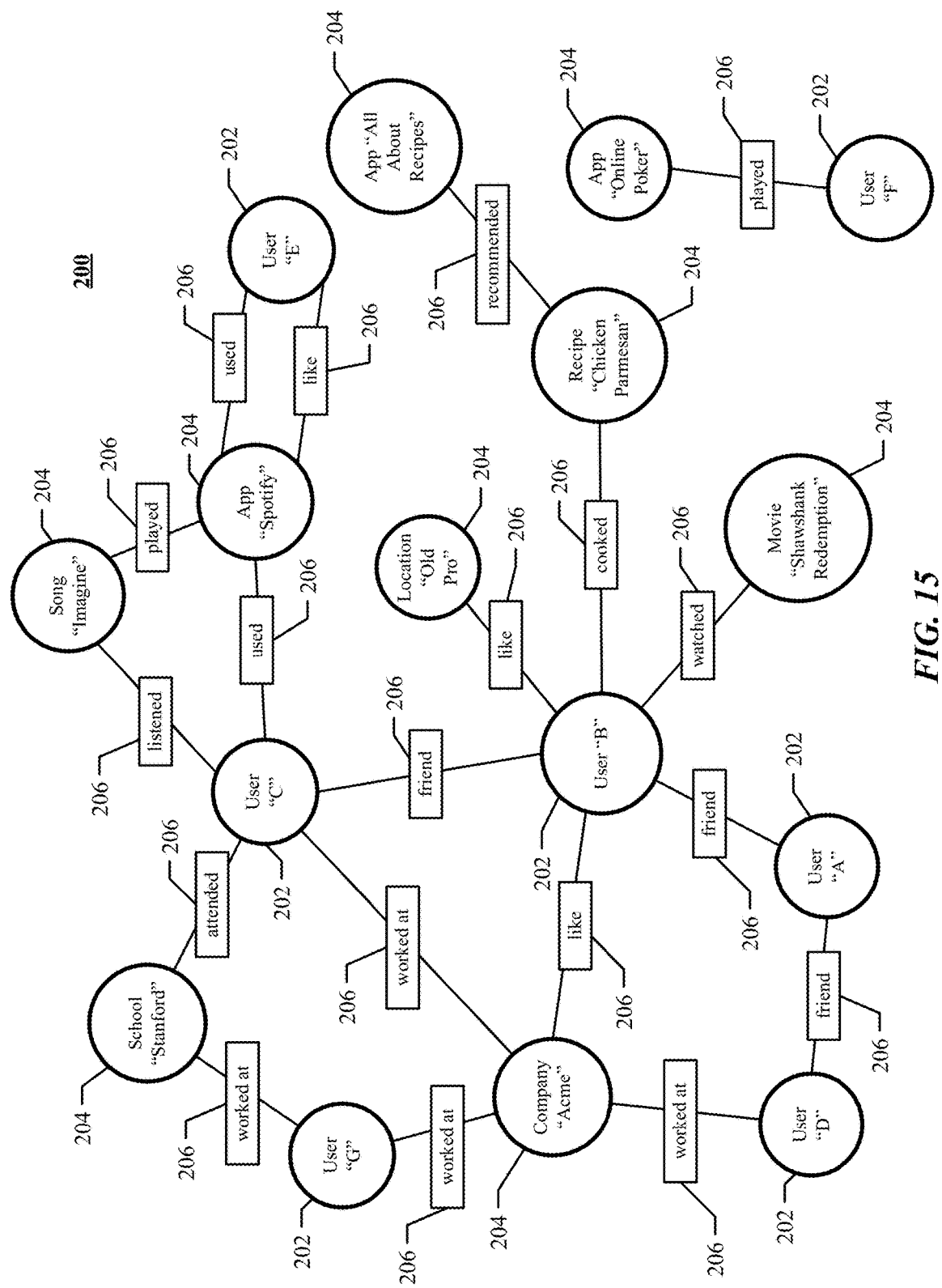
FIG. 15 illustrates an example social graph.

FIG. 15 illustrates example social graph 200. In particular embodiments, social-networking system 1460 may store one or more social graphs 200 in one or more data stores. In particular embodiments, social graph 200 may include multiple nodes—which may include multiple user nodes 202 or multiple concept nodes 204—multiple edges 206 connecting the nodes. Example social graph 200 illustrated in FIG. 15 is shown, for didactic purposes, in a two-dimensional visual map representation. In particular embodiments, social-networking system 1460, client system 1430, or third-party system 1470 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 1460. As an example and not by way of limitation, a user may be an individual (human user), an entity (e.g., an enterprise, business, or third-party application), or a group (e.g., of individuals or entities) that interacts or communicates with or over social-networking system 1460. In particular embodiments, when a user registers for an account with social-networking system 1460, social-networking system 1460 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 1460. In particular embodiments, a user node 202 may be associated with information provided by a user or information gathered by various systems, including social-networking system 1460. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-networking system 1460 or a third-party website associated with a web-application server); an entity (such as, for example, a person, business, group, sports team, or celebrity); a resource (such as, for example, an audio file, video file, digital photo, text file, structured document, or application) which may be located within social-networking system 1460 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 1460. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 1460. Profile pages may also be hosted on third-party websites associated with a third-party server 1470. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by third-party system 1470. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing client system 1430 to send to social-networking system 1460 a message indicating the user's action. In response to the message, social-networking system 1460 may create an edge (e.g., an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 1460 may send a "friend request" to the second user. If the second user confirms the "friend request," social-networking system 1460 may create an edge 206 connecting the first user's user node 202 to the second user's user node 202 in social graph 200 and store edge 206 as social-graph information in one or more of data stores 24. In the example of FIG. 15, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 15, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 1460 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 1460 may create a "listened" edge 206 and a "used" edge (as illustrated in FIG. 15) between user nodes 202 corresponding to the user and concept nodes 204 corresponding to the song and application to indicate that the user listened to the song and used the application. Moreover, social-networking system 1460 may create a "played" edge 206 (as illustrated in FIG. 15) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has said at a particular concept. Alternatively, another edge 206 may represent each type of relationship (or multiples of a single relationship) between a user node 202 and a concept node 204 (as illustrated in FIG. 15 between user node 202 for user "E" and concept node 204 for "SPOTIFY").

In particular embodiments, social-networking system 1460 may create an edge 206 between a user node 202 and a concept node 204 in social graph 200. As an example and not by way of limitation, a user viewing a concept-profile page (such as, for example, by using a web browser or a special-purpose application hosted by the user's client system 1430) may indicate that he or she likes the concept represented by the concept node 204 by clicking or selecting a "Like" icon, which may cause the user's client system 1430 to send to social-networking system 1460 a message indicating the user's liking of the concept associated with the concept-profile page. In response to the message, social-networking system 1460 may create an edge 206 between user node 202 associated with the user and concept node 204, as illustrated by "like" edge 206 between the user and concept node 204. In particular embodiments, social-networking system 1460 may store an edge 206 in one or more data stores. In particular embodiments, an edge 206 may be automatically formed by social-networking system 1460 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social-networking system 160). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social-networking system 160 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social-networking system 160) or RSVP (e.g., through social-networking system 160) to an event associated with the advertisement. In addition or as an alternative, an advertisement may include social-networking-system context directed to the user. As an example and not by way of limitation, an advertisement may display information about a friend of the user within social-networking system 160 who has taken an action associated with the subject matter of the advertisement.

In particular embodiments, social-networking system 1460 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 1470 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 1460 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 1460 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 1460 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 1460 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 1460 may calculate a coefficient based on a user's actions. Social-networking system 1460 may monitor such actions on the online social network, on a third-party system 1470, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 1460 may calculate a coefficient based on the user's actions with particular types of content. The content may be associated with the online social network, a third-party system 1470, or another suitable system. The content may include users, profile pages, posts, news stories, headlines, instant messages, chat room conversations, emails, advertisements, pictures, video, music, other suitable objects, or any combination thereof. Social-networking system 1460 may analyze a user's actions to determine whether one or more of the actions indicate an affinity for subject matter, content, other users, and so forth. As an example and not by way of limitation, if a user may make frequently posts content related to "coffee" or variants thereof, social-networking system 1460 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 1460 may calculate a coefficient based on the type of relationship between particular objects. Referencing the social graph 200, social-networking system 1460 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 1460 may determine that the user has a higher coefficient with respect to the first photo than the second photo because having a tagged-in-type relationship with content may be assigned a higher weight and/or rating than having a like-type relationship with content. In particular embodiments, social-networking system 1460 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 1460 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, social-networking system 1460 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 1430 of the user). A first user may be more interested in other users or concepts that are closer to the first user. As an example and not by way of limitation, if a user is one mile from an airport and two miles from a gas station, social-networking system 1460 may determine that the user has a higher coefficient for the airport than the gas station based on the proximity of the airport to the user.

In particular embodiments, social-networking system 1460 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 1460 may provide information that is relevant to user's interests and current circumstances, increasing the likelihood that they will find such information of interest. In particular embodiments, social-networking system 1460 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 1460 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 1460 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 1470 (e.g., via an API or other communication channel), or from another suitable system. In response to the request, social-networking system 1460 may calculate the coefficient (or access the coefficient information if it has previously been calculated and stored). In particular embodiments, social-networking system 1460 may measure an affinity with respect to a particular process. Different processes (both internal and external to the online social network) may request a coefficient for a particular object or set of objects. Social-networking system 1460 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 204 corresponding to a particular photo may have a privacy setting specifying that the photo may only be accessed by users tagged in the photo and their friends. In particular embodiments, privacy settings may allow users to opt in or opt out of having their actions logged by social-networking system 160 or shared with other systems (e.g., third-party system 170). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 162 may be authorization/privacy servers for enforcing privacy settings. In response to a request from a user (or other entity) for a particular object stored in a data store 164, social-networking system 160 may send a request to the data store 164 for the object. The request may identify the user associated with the request and may only be sent to the user (or a client system 130 of the user) if the authorization server determines that the user is authorized to access the object based on the privacy settings associated with the object. If the requesting user is not authorized to access the object, the authorization server may prevent the requested object from being retrieved from the data store 164, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Figure 16:
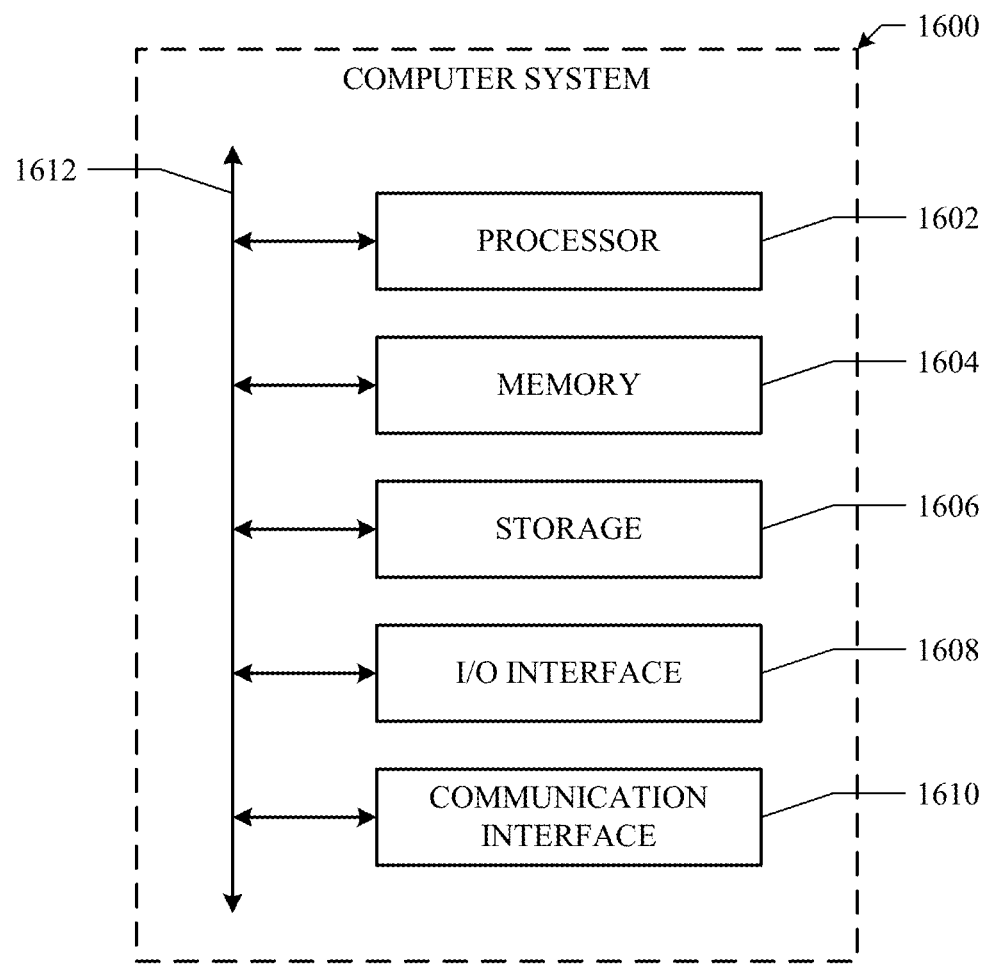
FIG. 16 illustrates an example computer system.

FIG. 16 illustrates an example computer system 1600. In particular embodiments, one or more computer systems 1600 perform one or more steps of one or more methods described or illustrated herein. In particular embodiments, one or more computer systems 1600 provide functionality described or illustrated herein. In particular embodiments, software running on one or more computer systems 1600 performs one or more steps of one or more methods described or illustrated herein or provides functionality described or illustrated herein. Particular embodiments include one or more portions of one or more computer systems 1600. Herein, reference to a computer system may encompass a computing device, and vice versa, where appropriate. Moreover, reference to a computer system may encompass one or more computer systems, where appropriate.

This disclosure contemplates any suitable number of computer systems 1600. This disclosure contemplates computer system 1600 taking any suitable physical form. As example and not by way of limitation, computer system 1600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1600 may include one or more computer systems 1600; be unitary or distributed; span multiple locations; span multiple machines; span multiple data centers; or reside in a cloud, which may include one or more cloud components in one or more networks. Where appropriate, one or more computer systems 1600 may perform without substantial spatial or temporal limitation one or more steps of one or more methods described or illustrated herein. As an example and not by way of limitation, one or more computer systems 1600 may perform in real time or in batch mode one or more steps of one or more methods described or illustrated herein. One or more computer systems 1600 may perform at different times or at different locations one or more steps of one or more methods described or illustrated herein, where appropriate.

In particular embodiments, computer system 1600 includes a processor 1602, memory 1604, storage 1606, an input/output (I/O) interface 1608, a communication interface 1610, and a bus 1612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1602 includes hardware for executing instructions, such as those making up a computer program. As an example and not by way of limitation, to execute instructions, processor 1602 may retrieve (or fetch) the instructions from an internal register, an internal cache, memory 1604, or storage 1606; decode and execute them; and then write one or more results to an internal register, an internal cache, memory 1604, or storage 1606. In particular embodiments, processor 1602 may include one or more internal caches for data, instructions, or addresses. This disclosure contemplates processor 1602 including any suitable number of any suitable internal caches, where appropriate. As an example and not by way of limitation, processor 1602 may include one or more instruction caches, one or more data caches, and one or more translation lookaside buffers (TLBs). Instructions in the instruction caches may be copies of instructions in memory 1604 or storage 1606, and the instruction caches may speed up retrieval of those instructions by processor 1602. Data in the data caches may be copies of data in memory 1604 or storage 1606 for instructions executing at processor 1602 to operate on; the results of previous instructions executed at processor 1602 for access by subsequent instructions executing at processor 1602 or for writing to memory 1604 or storage 1606; or other suitable data. The data caches may speed up read or write operations by processor 1602. The TLBs may speed up virtual-address translation for processor 1602. In particular embodiments, processor 1602 may include one or more internal registers for data, instructions, or addresses. This disclosure contemplates processor 1602 including any suitable number of any suitable internal registers, where appropriate. Where appropriate, processor 1602 may include one or more arithmetic logic units (ALUs); be a multi-core processor; or include one or more processors 1602. Although this disclosure describes and illustrates a particular processor, this disclosure contemplates any suitable processor.

In particular embodiments, memory 1604 includes main memory for storing instructions for processor 1602 to execute or data for processor 1602 to operate on. As an example and not by way of limitation, computer system 1600 may load instructions from storage 1606 or another source (such as, for example, another computer system 1600) to memory 1604. Processor 1602 may then load the instructions from memory 1604 to an internal register or internal cache. To execute the instructions, processor 1602 may retrieve the instructions from the internal register or internal cache and decode them. During or after execution of the instructions, processor 1602 may write one or more results (which may be intermediate or final results) to the internal register or internal cache. Processor 1602 may then write one or more of those results to memory 1604. In particular embodiments, processor 1602 executes only instructions in one or more internal registers or internal caches or in memory 1604 (as opposed to storage 1606 or elsewhere) and operates only on data in one or more internal registers or internal caches or in memory 1604 (as opposed to storage 1606 or elsewhere). One or more memory buses (which may each include an address bus and a data bus) may couple processor 1602 to memory 1604. Bus 1612 may include one or more memory buses, as described below. In particular embodiments, one or more memory management units (MMUs) reside between processor 1602 and memory 1604 and facilitate accesses to memory 1604 requested by processor 1602. In particular embodiments, memory 1604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1604 may include one or more memories 1604, where appropriate. Although this disclosure describes and illustrates particular memory, this disclosure contemplates any suitable memory.

In particular embodiments, storage 1606 includes mass storage for data or instructions. As an example and not by way of limitation, storage 1606 may include a hard disk drive (HDD), a floppy disk drive, flash memory, an optical disc, a magneto-optical disc, magnetic tape, or a Universal Serial Bus (USB) drive or a combination of two or more of these. Storage 1606 may include removable or non-removable (or fixed) media, where appropriate. Storage 1606 may be internal or external to computer system 1600, where appropriate. In particular embodiments, storage 1606 is non-volatile, solid-state memory. In particular embodiments, storage 1606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1606 taking any suitable physical form. Storage 1606 may include one or more storage control units facilitating communication between processor 1602 and storage 1606, where appropriate. Where appropriate, storage 1606 may include one or more storages 1606. Although this disclosure describes and illustrates particular storage, this disclosure contemplates any suitable storage.

In particular embodiments, I/O interface 1608 includes hardware, software, or both, providing one or more interfaces for communication between computer system 1600 and one or more I/O devices. Computer system 1600 may include one or more of these I/O devices, where appropriate. One or more of these I/O devices may enable communication between a person and computer system 1600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1608 for them. Where appropriate, I/O interface 1608 may include one or more device or software drivers enabling processor 1602 to drive one or more of these I/O devices. I/O interface 1608 may include one or more I/O interfaces 1608, where appropriate. Although this disclosure describes and illustrates a particular I/O interface, this disclosure contemplates any suitable I/O interface.

In particular embodiments, communication interface 1610 includes hardware, software, or both providing one or more interfaces for communication (such as, for example, packet-based communication) between computer system 1600 and one or more other computer systems 1600 or one or more networks. As an example and not by way of limitation, communication interface 1610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1610 for it. As an example and not by way of limitation, computer system 1600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1600 may include any suitable communication interface 1610 for any of these networks, where appropriate. Communication interface 1610 may include one or more communication interfaces 1610, where appropriate. Although this disclosure describes and illustrates a particular communication interface, this disclosure contemplates any suitable communication interface.

In particular embodiments, bus 1612 includes hardware, software, or both coupling components of computer system 1600 to each other. As an example and not by way of limitation, bus 1612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1612 may include one or more buses 1612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   receiving, at a computer server, information regarding an event proposal from an event organizer, wherein the information comprises an identification of a plurality of invitees, and wherein the information is missing one or more details of the event proposal, wherein the details comprise one or more event characteristics;
   sending, by the computer server, the information regarding the event proposal to one or more client devices, wherein each of the client devices is associated with one of the invitees;
   receiving, at the computer server, feedback regarding the event proposal from at least one of the invitees, wherein the receiving feedback regarding the event proposal from at least one of the invitees comprises creating a chat thread for discussion of details related to the event proposal;
   determining, by the computer server, at least one of the missing details of the event proposal based on the received feedback, wherein the determining at least one of the missing details of the event proposal based on the received feedback comprises:
     extracting one or more words or strings from one or more comments in the chat thread, and
     matching the extracted words or strings from the comments in the chat thread with one or more terms in the event proposal; and
   sending, by the computer server, information regarding final details of an event based on the event proposal to one or more of the client devices associated with the invitees.

2. The method of claim 1, wherein the receiving feedback regarding the event proposal from at least one of the invitees comprises:
   providing a chat interface to the invitees;
   sending a notification to the invitees that the chat thread has been created; and
   receiving, at the computer server, messages sent, using the chat interface, by the invitees in relation to the chat thread.

3. The method of claim 2, further comprising:
   for each of the invitees, sending a summary of the information regarding the event proposal as part of a list of event proposals that have been sent to the invitee, each entry of the list comprising a link to a corresponding chat thread, and wherein the sending the information regarding the final details of the event comprises sending an update to the summary of the information regarding the event proposal.

4. The method of claim 3, wherein the event proposal has been configured to expire after a particular duration of time, further comprising:
   once the duration of time has passed, sending a cancellation instruction for the event proposal to any one of the client devices from which no feedback has been received, wherein the cancellation instruction operates to remove the information regarding the event proposal from the client device and to remove the summary of the information regarding the event proposal from the list of event proposals.

5. The method of claim 1,
wherein the receiving feedback regarding the event proposal from at least one of the invitees comprises receiving one or more opt-in notifications related to the event proposal;
wherein the determining at least one of the missing details of the event proposal based on the received feedback comprises processing the opt-in notifications to determine a subset of the invitees who have opted in; and
wherein sending the information regarding the final details of the event to one or more of the client devices comprises sending the information regarding the final details of the event to only the client devices associated with invitees in the subset of the invitees.

6. The method of claim 1,
wherein the receiving feedback regarding the event proposal from at least one of the invitees comprises receiving one or more votes in a poll related to the at least one of the missing details; and
wherein the determining at least one of the missing details of the event proposal based on the received feedback comprises tallying the votes.

7. The method of claim 1, wherein the sending the information regarding the final details of the event further comprises:
sending information to request final confirmation of attendance.

8. The method of claim 7, wherein the sending the information to request final confirmation of attendance further comprises:
sending information to request pre-payment for the event.

9. The method of claim 1, further comprising:
upon receiving the information regarding the event proposal from the event organizer, providing the information regarding the event proposal to a third-party;
receiving sponsored content relating to one or more of the missing details; and
presenting the sponsored content to the event organizer or the invitees.

10. One or more computer-readable non-transitory storage media embodying software that is operable when executed to:
receive information regarding an event proposal from an event organizer, wherein the information comprises an identification of a plurality of invitees, and wherein the information is missing one or more details of the event proposal, wherein the details comprise one or more event characteristics;
send the information regarding the event proposal to one or more client devices, wherein each of the client devices is associated with one of the invitees;
receive feedback regarding the event proposal from at least one of the invitees, wherein the receive feedback regarding the event proposal from at least one of the invitees comprises create a chat thread for discussion of details related to the event proposal;
determine at least one of the missing details of the event proposal based on the received feedback, wherein the determine at least one of the missing details of the event proposal based on the received feedback comprises:
extract one or more words or strings from one or more comments in the chat thread, and
match the extracted words or strings from the comments in the chat thread with one or more terms in the event proposal; and
send information regarding final details of an event based on the event proposal to one or more of the client devices associated with the invitees.

11. The media of claim 10, wherein the receive feedback regarding the event proposal from at least one of the invitees comprises:
provide a chat interface to the invitees;
send a notification to the invitees that the chat thread has been created; and
receive messages sent, using the chat interface, by the invitees in relation to the chat thread.

12. The media of claim 10, wherein the software is further operable when executed to:
for each of the invitees, send a summary of the information regarding the event proposal as part of a list of event proposals that have been sent to the invitee, each entry of the list comprising a link to a corresponding chat thread, and wherein the send the information regarding the final details of the event comprises send an update to the summary of the information regarding the event proposal.

13. The media of claim 12, wherein the event proposal has been configured to expire after a particular duration of time, and the software is further operable when executed to:
once the duration of time has passed, send a cancellation instruction for the event proposal to any one of the client devices from which no feedback has been received, wherein the cancellation instruction operates to remove the information regarding the event proposal from the client device and to remove the summary of the information regarding the event proposal from the list of event proposals.

14. The media of claim 10,
wherein the receive feedback regarding the event proposal from at least one of the invitees comprises receive one or more opt-in notifications related to the event proposal;
wherein the determine at least one of the missing details of the event proposal based on the received feedback comprises process the opt-in notifications to determine a subset of the invitees who have opted in; and
wherein the send the information regarding the final details of the event to one or more of the client devices comprises send the information regarding the final details of the event to only the client devices associated with invitees in the subset of the invitees.

15. The media of claim 10,
wherein the receive feedback regarding the event proposal from at least one of the invitees comprises receive one or more votes in a poll related to the at least one of the missing details; and
wherein the determine at least one of the missing details of the event proposal based on the received feedback comprises tally the votes.

16. The media of claim 10, wherein the send the information regarding the final details of the event further comprises:
send information to request final confirmation of attendance.

17. The method of claim 1, wherein the determining at least one of the missing details of the event proposal based on the received feedback further comprises determining how many of certain words or strings are present in the chat thread.

18. The method of claim 17, wherein the certain words or strings comprise names of one or more proposed venues.

19. A system comprising:
one or more processors; and
a memory coupled to the processors comprising instructions executable by the processors, the processors being operable when executing the instructions to:
receive information regarding an event proposal from an event organizer, wherein the information comprises an identification of a plurality of invitees, and wherein the information is missing one or more details of the event proposal, wherein the details comprise one or more event characteristics;
send the information regarding the event proposal to one or more client devices, wherein each of the client devices is associated with one of the invitees;
receive feedback regarding the event proposal from at least one of the invitees, wherein the receive feedback regarding the event proposal from at least one of the invitees comprises create a chat thread for discussion of details related to the event proposal;
determine at least one of the missing details of the event proposal based on the received feedback, wherein the determine at least one of the missing details of the event proposal based on the received feedback comprises:
extract one or more words or strings from one or more comments in the chat thread, and
match the extracted words or strings from the comments in the chat thread with one or more terms in the event proposal; and
send information regarding final details of an event based on the event proposal to one or more of the client devices associated with the invitees.

20. The system of claim 19, wherein the receive feedback regarding the event proposal from at least one of the invitees comprises:
provide a chat interface to the invitees;
send a notification to the invitees that the chat thread has been created; and
receive messages sent, using the chat interface, by the invitees in relation to the chat thread.

* * * * *